(12) United States Patent
de Bruijn et al.

(10) Patent No.: US 8,984,882 B2
(45) Date of Patent: Mar. 24, 2015

(54) SOLAR RECEIVER HAVING BACK POSITIONED HEADER

(75) Inventors: Jacobus Johannes de Bruijn, Waddinxveen (NL); Arie Meerkerk, Giessenburg (NL); Peter Simon Rop, Zoetermeer (NL)

(73) Assignee: Nem Energy B.V., Bl Zoeterwoude (NL)

( * ) Notice: Subject to any disclaimer, the term of this patent is extended or adjusted under 35 U.S.C. 154(b) by 832 days.

(21) Appl. No.: 13/148,705

(22) PCT Filed: Feb. 8, 2010

(86) PCT No.: PCT/NL2010/000021
§ 371 (c)(1),
(2), (4) Date: Oct. 27, 2011

(87) PCT Pub. No.: WO2010/093235
PCT Pub. Date: Aug. 19, 2010

(65) Prior Publication Data
US 2012/0031094 A1 Feb. 9, 2012

Related U.S. Application Data

(60) Provisional application No. 61/152,483, filed on Feb. 13, 2009.

(30) Foreign Application Priority Data

Feb. 13, 2009 (NL) ..................................... 2002529

(51) Int. Cl.
| F03G 6/00 | (2006.01) |
| F03G 7/00 | (2006.01) |
| F24J 2/08 | (2006.01) |
| F24J 2/10 | (2006.01) |
| F24J 2/07 | (2006.01) |
| F03G 6/06 | (2006.01) |
| F22B 1/00 | (2006.01) |
| F24J 2/24 | (2006.01) |
| F24J 2/46 | (2006.01) |

(52) U.S. Cl.
CPC . F24J 2/07 (2013.01); F03G 6/065 (2013.01); F22B 1/006 (2013.01); F24J 2/245 (2013.01);

(Continued)

(58) Field of Classification Search
CPC ........... Y02E 10/41–10/47; F03G 6/06; F03G 6/065; F03G 6/067
USPC ...................... 60/641.8–641.15; 126/569–713
See application file for complete search history.

(56) References Cited

U.S. PATENT DOCUMENTS

| 4,485,803 A * | 12/1984 | Wiener .......................... 126/591 |
| 5,850,831 A * | 12/1998 | Marko ........................... 126/645 |

(Continued)

FOREIGN PATENT DOCUMENTS

| DE | 10248068 A1 | 5/2004 |
| EP | 1873397 A2 | 1/2008 |

(Continued)

OTHER PUBLICATIONS

English abstract for SU 1776936.
(Continued)

*Primary Examiner* — Christopher Jetton

(57) ABSTRACT

A solar receiver includes at least two receiver panels having a common outer front surface for receiving incident solar radiation from a field of mirrors. The receiver panels include an array of side by side arranged heat exchange tubes which have a substantially straight main portion which extend in an upwards longitudinal direction and an inwards extending portion for a connection to an input or output header for respectively distributing or collecting fluid to or from the heat exchange tubes. The receiver panels are spaced apart in the upwards direction at a distance of Z cm. The header for the solar receiver is spaced behind the front surface at a distance of A cm, wherein the quotient of Z and A, Z/A, at the most equals the quotient of a vertical V and a horizontal H distance, V/H, from the header to a most far positioned mirror.

14 Claims, 7 Drawing Sheets

(52) U.S. Cl.
CPC ........ *F24J 2/4623* (2013.01); *F24J 2002/1076*
(2013.01); *Y02E 10/41* (2013.01); *Y02E 10/44*
(2013.01); *Y02E 10/46* (2013.01)
USPC ............... 60/641.15; 60/641.11; 126/684;
126/701

(56) References Cited

U.S. PATENT DOCUMENTS

| | | | |
|---|---|---|---|
| 6,931,851 B2* | 8/2005 | Litwin | ............... 60/641.11 |
| 2004/0112374 A1 | 6/2004 | Litwin | |
| 2008/0078378 A1 | 4/2008 | Zhu | |

FOREIGN PATENT DOCUMENTS

| | | |
|---|---|---|
| EP | 2000669 A2 | 12/2008 |
| FR | 2539851 A1 | 7/1984 |
| SU | 1776936 A1 | 11/1992 |

OTHER PUBLICATIONS

Pomeroy et al., "Alternative Configurations for Sodium-Cooled Solar Thermal Power Plants", IEEE Transactions on Power Apparatus and Systems, vol. PAS-99, No. 5, pp. 2012-2019, 1980.

* cited by examiner though they are mostly bulky and robust. Fourth, the ceramic shields are not able to contribute to the process of conversion from solar energy to thermal energy as any received solar radiation is reflected and further the ceramic material is a relative good insulator against flow of heat.

SOLAR RECEIVER HAVING BACK POSITIONED HEADER

CROSS-REFERENCE TO RELATED APPLICATIONS

This application is the National Stage of International Application No. PCT/NL2010/000021, filed Feb. 8, 2010, which claims the benefit of U.S. Provisional Application No. 61/152,483, filed Feb. 13, 2009, and Netherlands Application No. 2002529, filed Feb. 13, 2009, the contents of which are incorporated by reference herein.

FIELD OF THE INVENTION

This patent application presents several inventions which may be considered as stand alone inventions or aspects, but which inventions or aspects may also be combined in one embodiment as complementary to each other and/or to reinforce obtainable effects.

According to a first aspect 708, the present invention relates to a solar receiver comprising at least two adjacent receiver panels having an outer front surface for receiving incident solar radiation. The solar receiver according to the invention is in particular designed for receiving redirected concentrated solar radiation from e.g. a field of heliostats. The receiver panel comprises an array of side by side arranged heat exchange tubes. The heat exchange tubes have a substantially straight main portion which extends in a longitudinal direction. The main portions of the heat exchange tube are preferably upwards arranged in a plane and may have a length of e.g. five meters. Further, the heat exchange tubes have inwards extending portions for a connection to an input or output header. A heat transfer fluid, like water may be supplied to the input header which distributes the heat transfer fluid to the heat exchange tubes. The output header is provided for collecting the fluid from the heat exchange tubes.

BACKGROUND OF THE INVENTION

Such a solar receiver is for example suitable for a solar power installation as disclosed in EP 1873397 which discloses a solar power tower to generate electric power from sunlight by focussing concentrated solar radiation on a tower-mounted solar receiver. The solar power tower installation typically includes a "cold" storage tank, a solar receiver, heliostats, a "hot" storage tank, and an energy conversion system, such as a steam generator and turbine/generator set. In operation, a heat transfer fluid is pumped from the cold storage tank to the solar receiver. The solar receiver is typically positioned 50 feet to 250 feet or more above ground and is heated by the heliostats. The heliostats redirect and concentrate solar radiation from the sun onto the solar receiver, which converse solar energy from the incident sunlight to thermal energy. The heat transfer fluid flows through heat exchange tubes of the solar receiver where it is heated by the concentrated solar energy. The heat transfer fluid subsequently transports the thermal energy from the solar receiver to e.g. a steam generator to generate steam, wherein the thermal energy of the steam is used in a steam turbine/generator set to generate electricity. In case of Direct Steam Generation, the heat transfer fluid flowing through the solar receiver is water, wherein steam is directly generated in the solar receiver.

A similar solar receiver is known from a solar power installation which has been built on an industrial scale. The solar power installation has an electrical capacity of at least 5 MWe. The built solar power installation has a field of heliostats which surround a centrally positioned solar power tower. The solar power tower has a top with a height of approximately 80 meters. The solar receiver, comprising a plurality of receiver panels, is mounted in the upper region of the solar power tower. The receiver panels are arranged in groups at different height levels along a circumferential wall of the solar power tower. The groups of receiver panels are mounted above each other. The lowest group of receiver panels defines a superheater. The second group of receiver panels above the superheater defines an evaporator.

The known receiver panel comprises parallel arranged heat exchange tubes which are at both ends connected in a lower and an upper region to an input or output header. The input header distributes a supplied heat transfer fluid, e.g. water in the case of Direct Steam Generation, over the heat exchange tubes. The output header collects the heated fluid to supply it further to a next group of receiver panels, to a separator vessel or to the steam turbine.

The heat exchange tubes of the receiver panel have a straight main portion which is upwards, substantially vertically, arranged in an array. This array of main portions of the heat exchange tubes together form a panel. The straight main portions of the heat exchange tubes are at both sides provided with an inwards extending portion to get a U-shape configuration. The U-shape configuration gives a heat exchange tube a flexibility to expand in a controllable way. The inwards extending portions are single bended and directly connected to one of the headers. The inwards extending portion may give the main portion a freedom to expand and move in a longitudinal, here upwards, direction.

The input and output headers comprise a main conduit with connector organs which are arranged in an array in a length direction. Each heat exchange tube is by its inwards extending portion connected to a corresponding connector organ at the main conduit.

The receiver panels of the known solar receiver have an array of exchange tubes which are held together by a support for arranging the heat exchange tubes close to each other. The heat exchange tubes are kept close together, wherein an individual heat exchange tube is freely arranged to be movable relative to neighbouring heat exchange tubes. The heat exchange tubes are arranged as close as possible to each other to achieve an optimum exchange of heat. Gaps or spacers between the heat exchanges tubes are not desirable as these reduce the rate of conversion of solar to thermal energy by the solar receiver.

A drawback of the known solar receiver is that the headers and other components behind the receiver panel are susceptible for damage caused by high temperatures as a result of heat fluxes from the solar radiation. The headers are located at the top and bottom of the receiver panel. During use the headers may be heated by incident solar radiation. Too much heating may result in damage.

It has been tried to overcome this problem of overheating by arranging shields in front of the receiver panel to cover and protect the headers. The shields may extend along a side edge of the receiver panel to prevent overheating by solar radiation of edge zones of the receiver panel. The prior art shields are made of a ceramic material to withstand the occurring high temperatures caused by concentrated radiation. The application of ceramic shields has not been proved satisfying. First, the ceramic shields reflect a part of the solar radiation that was focussed by the Heliostats on the solar receiver back to the environment and thereby reducing the conversion from solar energy to thermal energy in the solar receiver. Secondly, the ceramic shields have proven to be very vulnerable for damage due to brittleness of the material and the daily warm up and cool down of the shield with sun set and -rise. Summarized, the presence of shields means a loss of solar energy and therefore a strong reduction of a capability to convert solar energy into thermal energy.

SUMMARY OF THE INVENTION

It is an object of the present invention to overcome at least one of the above-mentioned drawbacks and/or to provide at least a useful alternative.

This object is achieved by the solar receiver according to the present invention.

The solar receiver according to the invention comprises at least two adjacent receiver panels having an outer front surface for receiving incident solar radiation from a field of mirrors. The incident solar radiation may come from e.g. a field of heliostats which redirect and focus incoming sunlight. The receiver panel of the solar receiver comprises an array of side by side arranged heat exchange tubes. The heat exchange tubes have a substantially straight main portion which extends in an upwards, longitudinal direction. The solar receiver may be mounted on top of a solar power tower, wherein the straight main portions of the heat exchange tubes extend in an upwards direction. The heat exchange tubes of the solar receiver according to the invention have at least one inwards extending portion for a connection of the heat exchange tube to an input of output header. Preferably, the heat exchange tubes have two inwards extending portions to connect the heat exchange tubes to respectively a input and output header. The headers are arranged at the backside of the receiver panel. The input header serves to distribute a heat transfer fluid to the heat exchange tubes and the output header serves to collect the heat transfer fluid from the heat exchange tubes. The input header may be arranged at a lower region of the receiver panel, wherein the output header may be arranged at an upper region of the receiver panel or vice versa. Preferably, the heat transfer fluid is water or a water mixture for a direct steam generation process. The at least two receiver panels are spaced apart in the upwards direction at a distance of Z cm.

The solar receiver according to the invention is characterized in that the header is spaced behind the front surface at a distance of 'A' cm. The quotient of the distances Z and 'A', Z/A, at the most equals the quotient of a vertical V and a horizontal H distance, V/H, from the header to a most far positioned mirror or heliostat of the solar power installation.

In an embodiment of the solar receiver according to the invention the header is arranged at an 'A'-distance of at least 80 cm behind the outer front surface of the receiver panel. The header is in particular arranged at a distance of at least 100 cm, but preferably arranged at a distance of at least 110 cm. The headers may be arranged close to the edges of the receiver panel. Advantageously, the inwards distance A in between the header and the outer front surface of the receiver panel assures that the header remains outside a region which is susceptible to direct incident solar radiation, which may advantageously decrease a risk on damage caused by high temperatures to the headers. Preferably, all headers of the solar receiver are back positioned with respect to the receiver panel to position the headers out of reach of redirected solar radiation.

Preferably, the solar receiver according to the invention may be installed on top of a solar power tower which may be located within a field of heliostats, wherein solar radiation from the most far positioned heliostats cannot directly reach a header of the solar receiver but hits inwards extending heat exchanger tubes in stead. This may have the advantage that radiation might not be reflected back to surroundings which is the case by prior art shields in front of the solar panels, but according to the invention may be used for conversion to thermal energy. This may result in an increase of conversion of solar to thermal energy.

It may be a further advantage that the prior art ceramic shields are no longer necessary. These ceramic shields in front of the receiver panel would cause optical losses. The solar receiver according to the invention without the ceramic shields may have an increased conversion rate of solar energy to thermal energy.

In a preferred embodiment the quotient of the Z/A distances at the most equals the quotient of the V/H distances in cold conditions. Advantageously, this may assure that the headers remain out of direct solar radiation during start and stop procedures in use of the solar receiver. In an alternative embodiment of the solar receiver according to the invention the quotient Z/A at the most equals V/H during hot conditions. During use the receiver panels are heated. The height of a space in between two adjacent receiver panels may decrease as a result of expansions in the longitudinal direction of heat exchange tubes. In this embodiment overheating of the headers may be prevented by keeping the headers out of direct solar radiation during steady state use over a period of e.g. two or more hours.

In an embodiment of the solar receiver according to the invention, the heat exchange tubes may be staggered connected to the header. The staggered connection gives an alternating changing height of the space in between two adjacent receiver panels. The height distance Z of the space in this embodiment is determined by the smallest height distance of the space. Based on this distance Z and the quotient V/H a sufficient large distance 'A' can be calculated for the positioning of the headers behind the front surface. This embodiment of the solar receiver according to the invention including a minimum distance A advantageously improves the lifetime of the headers and protects the headers against too much direct solar radiation.

In an embodiment of the solar receiver according to the invention the receiver panel has a main panel portion having U-shaped heat exchange tubes. The main panel portion is defined as the portion of the panel comprising the heat exchange tubes in front of the headers. The receiver panel may have an auxiliary side panel portion at a side of the main panel portion, also called a side panel. The inwards extending portion of a heat exchange tube forming the main panel portion may comprise a single bend. Herewith, the geometry may remain simple to manufacture and to assemble. Advantageously, an inwards extending portion having a single bend instead of a more complex curvature may have a decreased flow resistance. Preferably, the single bend between the main portion and the inwards extending portion has an angle of at least 80° and at most 100°, preferably 85° to 95°.

In an advantageous embodiment according to the invention the receiver panel comprises downwards extending heat exchange tubes, wherein both main portions as inwards extending portions extend downwards or at the most horizontal. This may give a great advantage in that the receiver panel may be easy drainable by gravity. The heat exchange tubes of a receiver panel can easily be emptied by a down flow of heat transfer fluid. A heat transfer fluid, like water, in the receiver panel may be discharged from a bottom region e.g. by opening a valve. A drainable receiver panel may be favourable during start up and stop proceedings to reduce a risk on damage to the heat exchange tubes.

In a further embodiment of the main panel according to the invention, the main straight portion of a heat exchange tube may have inwards extending portions at both ends. Herewith, the heat exchange tube obtains a U-shaped configuration. In the U-shaped configuration the inwards extending portion extends within a plane substantially orthogonally to the longitudinal direction which is defined by the main portion. The U-shape configuration gives a heat exchange tube a flexibility to expand in a controllable way. The inwards extending portions are single bended and directly connected to one of the headers. The inwards extending portion may give the main portion a freedom to expand and move in a longitudinal, here upwards, direction. Herewith, a risk on undefined deformations of the main portion may be reduced.

In an embodiment according to the invention the solar receiver comprises a substantially vertically arranged receiver panel, wherein the receiver panel comprises U-shaped heat exchange tubes. The main straight portions are arranged upwards. A first inwards extending portion at the upper end of the main straight portions connects the heat exchange tube to a first header. A second inwards extending portion at the lower end of the main straight portion connects the heat exchange tube at a second header. The first header is arranged above the second header. The first header is arranged above or at least at the same height level of the upper end of the main straight portion and the second header is arranged below or at least at the same height level of the lower end of the main straight portion to obtain a by gravity drainable configuration. If the receiver panel needs to be discharged, the heat transfer fluid can flow freely downwards from the first header to the second header. After a drain operation no or hardly no fluid remains in the heat exchange tube.

In an embodiment of the solar receiver according to the invention the inwards extending portion may be provided with a shield. The shield may be connected to the inward extending portion for shielding the header. The shield may be welded to the inwards extending portion. Preferably, the shield is plate shaped. The shield may be of a ceramic material, but preferably the shield is made of stainless steel. The shield of stainless steel may advantageously have sufficient heat resistant properties to withstand the high temperatures which occur during the conversion of solar power on an industrial scale. The shield of stainless steel comprises advantageously a reflection surface for reflecting incident solar radiation. The incident solar radiation may be reflected towards a neighbouring heat exchange tube which advantageously increase the conversion of solar energy to thermal energy in the solar receiver. In an alternative embodiment, the shield may be black coloured which increased the conversion of solar energy to thermal energy. The shield may be made of the same material as the heat exchange tube, which provides good welding properties.

The shield may be plate shaped and connected to a group of inwards extending portions. The plate shaped shield may have a staggered hole pattern which allow the heat exchange tube to pass trough the shield. The inwards extending portions may be staggered connected to the header. The inwards extending portions may be arranged at a different height level. The heat exchange tubes may for example be connected to the header by connector organs which are aligned over two lines. The shields may be connected to heat exchange tubes which are connected in the same line. Herewith a plurality of shields may be provided to protect the header from solar radiation. Preferably, the shields are spaced apart from the header at different distances. This allows an overlapping arrangement of the shields. The overlap between neighbouring shields, advantageously, improves the protection against incident solar radiation.

The invention further relates to an assembly of receiver panels. In an embodiment of the solar receiver according to the invention the receiver panel is assembled together with at least one further receiver panel. The at least two receiver panels together form a receiver panel assembly. Two adjacent receiver panels may be arranged in substantially a common plane which is e.g. defined by a side wall of a solar receiver. Both receiver panels may have an aligned outer front surface in the longitudinal direction of the heat exchange tubes, wherein at least one header may be arranged at the back side of the receiver panels. The header may be arranged in between two adjacent receiver panels. To protect the header from direct incident solar radiation, the distance between the header at the outer front surface may be at least 80 cm.

In an embodiment of the solar receiver assembly according to the invention, two adjacent receiver panels are spaced apart from each other within a common plane. The receiver panels may e.g. be spaced apart in upwards direction. This may result in a space between the receiver panels having a diameter in the longitudinal direction of the heat exchange tubes of at least 30 cm, in particular at least 40 cm and in particular at most 50 cm. The space may be necessary to compensate for expansions of the main portions of the heat exchange tubes in the longitudinal direction. A maximum space height of at most 50 cm is preferred to reduce optical losses. Without a covering shield, the space in between the receiver panels may be susceptible for incident solar radiation. Especially, in such an arrangement of the receiver panels it is advantageous to have headers which are sufficient far positioned at the back side of the receiver panels. By arranging the headers sufficiently far inwards behind the space, it may be assured that the header is not susceptible to direct incident solar radiation.

In a further improved embodiment of the solar receiver assembly according to the invention a first shield may be connected to an inwards extending portion of a first solar receiver, wherein a second shield may be connected to an inwards extending portion of a second solar receiver. Preferably, the first shield overlaps with the second shield in an inwards direction. The presence of shields further improves the protection of a header against direct incident solar radiation.

In a particular embodiment of the solar receiver assembly according to the invention four groups of receiver panels may be mounted to a solar receiver. A first group of receiver panels may function as an evaporator, a second group of receiver panels as a superheater and a third group of receiver panels as a reheater and a fourth group of receiver panels as a preheater.

Further embodiments according to the invention are defined in the dependent claims.

In a second aspect 706, the present invention relates to a solar receiver comprising at least one receiver panel. The panel has an outer front surface for receiving incident solar radiation. The panel comprises an array of heat exchange tubes. The heat exchange tubes are held together by a support for arranging the heat exchange tubes substantially parallel and close to each other.

Such a solar receiver is for example suitable for a solar power installation as disclosed in EP 1873397 which discloses a solar power tower to generate electric power from sunlight by focussing concentrated solar radiation on a tower-mounted solar receiver. The solar power tower installation typically includes a "cold" storage tank, a solar receiver, heliostats, a "hot" storage tank, and an energy conversion system, such as a steam generator and turbine/generator set. In operation, a heat transfer fluid is pumped from the cold storage tank to the solar receiver. The solar receiver is typically positioned 50 feet to 250 feet or more above ground and is heated by the heliostats. The heliostats redirect and concentrate solar radiation from the sun onto the solar receiver, which converse solar energy from the incident sunlight to thermal energy. The heat transfer fluid flows through heat exchange tubes of the solar receiver where it is heated by the concentrated solar energy. The heat transfer fluid subsequently transports the thermal energy from the solar receiver to e.g. a steam generator to generate steam, wherein the thermal energy of the steam is used in a steam turbine/generator set to generate electricity. In case of Direct Steam Generation, the heat transfer fluid flowing through the solar receiver is water, wherein steam is directly generated in the solar receiver.

A similar solar receiver is known from a solar power installation which has been built on an industrial scale. The solar power installation has an electrical capacity of at least 5 MWe. The built solar power installation has a field of heliostats which surround a centrally positioned solar power tower. The solar power tower has a top with a height of approximately 80 meters. The solar receiver, comprising a plurality of receiver panels, is mounted in the upper region of the solar power tower. The receiver panels are arranged in groups at different height levels along a circumferential wall of the solar power tower. The groups of receiver panels are mounted above each other. The lowest group of receiver panels defines a superheater. The second group of receiver panels above the superheater defines an evaporator.

The known receiver panel comprises parallel arranged heat exchange tubes which are at both ends connected in a lower and an upper region to an input or output header. The input header distributes a supplied heat transfer fluid, e.g. water in the case of Direct Steam Generation, over the heat exchange tubes. The output header collects the heated fluid to supply it further to a next group of receiver panels, to a separator vessel or to the steam turbine.

The heat exchange tubes of the receiver panel have a straight main portion which is upwards, substantially vertically, arranged in an array. This array of main portions of the heat exchange tubes together forms a panel. The straight main portions of the heat exchange tubes are at both sides provided with an inwards extending portion to get a U-shape configuration. The U-shape configuration gives a heat exchange tube a flexibility to expand in a controllable way. The inwards extending portions are single bended and directly connected to one of the headers. The inwards extending portion may give the main portion a freedom to expand and move in a longitudinal, here upwards, direction.

The input and output headers comprise a main conduit with connector organs which are arranged in an array in a length direction. Each heat exchange tube is by its inwards extending portion connected to a corresponding connector organ at the main conduit.

The receiver panels of the known solar receiver have an array of exchange tubes which are held together by a support for arranging the heat exchange tubes close to each other. The heat exchange tubes are kept close together, wherein an individual heat exchange tube is freely arranged to be movable relative to neighbouring heat exchange tubes. The heat exchange tubes are arranged as close as possible to each other to achieve an optimum exchange of heat. Gaps or spacers between the heat exchanges tubes are not desirable as these reduce the rate of conversion of solar to thermal energy by the solar receiver.

However, it is a problem that gaps between the heat exchange tubes are unavoidable.

Due to the insolation on the front surface of the heat exchange tubes, the heat exchange tubes will get a higher temperature at the front surface in comparison with the shaded backside of the heat exchange tubes. As a result the heat exchange tubes will bend outwards which cause enlarged gaps in between the heat exchange tubes.

The presence and enlargement of gaps is further enhanced by the concentration and focussing of solar radiation on the receiver panel in a solar spot. The solar spot causes a temperature maldistribution over the heat exchange tubes. The highest temperatures are reached in the middle of the solar spot, while the temperatures more outside are lower. Heat exchange tubes in the middle of the solar spot will get a higher temperature than heat exchange tubes more at the side of the receiver panel. This cause various thermal expansions of the heat exchange tubes in a traverse and longitudinal direction within the panel which brings further enlargements of the gaps between heat exchange tubes.

Also, tolerances in manufacturing of the panel initially cause gaps between the heat exchange tubes. Preferably, the width of a gap between two adjacent tubes is at most one millimeter after manufacturing in a steady state.

The gaps between the heat exchange tubes bring a loss of effectiveness, e.g. a reduction of conversion from solar to thermal energy, but may additionally cause problems in that components behind the receiver panel may get damaged. Components may be exposed to higher temperatures than they are designed for which results in reduction of life time or even failure. The high temperature behind the receiver panels in a solar power tower may bring further problems to service or inspect components of the solar power installation. To overcome these problems it has been tried to provide a kind of insulation means to shield of the components behind the solar receiver. However this solution has not been proved satisfying.

It is an object of the present invention to overcome at least one of the above-mentioned problems and/or to provide a useful alternative solution.

This aim is achieved by a solar receiver as defined in clause 706__1.

The solar receiver according to the invention comprises at least one receiver panel which has an outer front surface for receiving incident solar radiation. The panel is formed by an array of heat exchange tubes which are held together by a support. The support arranges the heat exchange tubes substantially parallel and close to each other. Preferably, the solar receiver according to the invention is designed for receiving redirected concentrated solar radiation from e.g. a field of heliostats.

The solar receiver according to the invention is characterised in that the panel comprises a transmission element behind at least one gap between adjacent heat exchange tubes. As explained above it is unavoidable to get gaps between adjacent heat exchange tubes due to o.a. a temperature distribution as a result of a solar spot. During use of the solar receiver, solar radiation may get through a gap between heat exchange tubes and shine on the transmission element. According to the invention, the heat transmission element behind the gap reflects the solar radiation or emits the solar energy to the adjacent heat exchange tubes. Preferably, the transmission element reflects the solar radiation to mainly a back side of a heat exchange tube. Advantageously, this may increase the conversion from solar to thermal energy by the receiver panel. In addition, by heating the back side of heat exchange tubes a more constant circumferential heating of the heat exchange tubes may occur which may reduce radial deformations of the tubes and hence reduce an enlargement of the gaps.

The presence of the transmission element may further increase the effectiveness of the heat exchange tubes by reducing negative influences of wind and rain. The transmission element behind the heat exchange tubes may prohibit a free passage of wind through the gaps which would have cause an undesired cooling of the heat exchange tubes. The transmission element may prevent draught which may increase the heat exchange capacity of the receiver panel. Additionally, the transmission element may protect components behind the receiver panel against direct weather influences, like sunshine, rain and wind.

In an embodiment, the transmission element may be plate shaped, wherein the transmission element is connected to the heat exchange tubes for a conductive heat transfer to the heat exchange tubes. The transmission element may be positioned against the heat exchange tubes. The transmission element may be in contact with the heat exchange tubes. The plate shaped transmission element may be black coloured for an improved absorption of the incident radiation. Alternatively, the transmission element may be spaced apart from the heat exchange tubes, wherein absorbed heat may be emitted by e.g. convection to neighbouring heat exchange tubes.

In a preferred embodiment the transmission element behind the gap is a reflector element for reflecting incident radiation to the adjacent heat exchange tubes. Preferably, the reflector element is plate shaped. The reflector element may be made of stainless steel which has sufficient reflecting properties. A reflector element out of stainless steel in stead of e.g. a glass material may advantageously be sufficient heat resistant to withstand the high occurring temperatures. Advantageously, the transmission element as a reflector element remains relatively cool which improves the thermal conditions behind the solar receiver. This may result in better circumstances to fulfil maintenance or inspection operations.

A further advantage of the reflector element is that the adjacent heat exchange tubes are now also heated at a back side. The heat exchange tubes are heated-up at the front surface by the solar spot and at the backside by the radiation from the reflector element. Herewith, the temperature gradient over a cross section of a heat exchange tube is decreased which will cause less deformations of the heat exchange tube in radial directions. The decreased deformation of heat exchange tubes may reduce gaps which may have a positive effect on the overall heat exchange e.g. the conversion from solar to thermal energy by the solar receiver.

In a further preferred embodiment, the reflector element of the solar receiver according to the invention is multilayered. The multilayered reflector element comprises an outer reflecting layer having a reflecting surface for reflecting incident solar radiation. The reflecting surface may be a reflecting coating or a polished surface. Preferably, the reflecting layer is a sheet which is made of stainless steel. In an alternative embodiment the reflecting layer may contain a fabric The multilayered reflector element may further comprise at least one inner insulating layer. The insulating layer may be formed by a layer of wool, a wall of stones or tiles, a hollow wall, an enclosed air layer etc. Advantageously, herewith, the insulating properties of the reflector element may be improved to protect other components of the solar power installation.

In a preferred embodiment of the solar receiver according to the invention the reflector element may be combined with an additional insulating element. The reflector element may be spaced apart from the insulating element, wherein the reflector element comprises an outer reflecting surface. The insulating element may comprise insulating materials. The spaced apart arrangement of the reflector and insulating element may have improved insulating properties. Herewith, the thermal circumstances behind the receiver panels may be further improved.

In a further embodiment the spaced apart arrangement may result in a cavity between the reflector and insulating element which may be accessible for a human being. Advantageously, the possibilities for erection, maintenance and inspection of the solar power installation may be improved. The cavity may comprise accessing means like gates, stairs and floors.

In an embodiment of the solar receiver according to the invention the receiver panel includes heat exchange tubes having a U-shaped configuration. Herewith, a risk on undefined deformations of the main portion may be reduced. For start and stop proceedings of the solar power installation, it may be important that all fluid in the receiver panels can be drained to empty the receiver panels. The U-shaped configuration of the heat exchange tubes according to the invention has downwards or at the most horizontal extending heat exchange tubes which makes the receiver panel drainable.

Preferably, the receiver panel according to the invention comprises one single array or less preferably two arrays of heat exchange tubes. One single or two arrays of heat exchange tubes provide a favourable ratio in use of material and heat exchange capacity. Other embodiments according to the invention are defined in the dependent clauses.

The invention further relates to a solar power tower or a solar power installation according to respectively clause 706 8 or 706 9 comprising at least one solar receiver according to the invention.

In an embodiment of the solar power tower according to the invention the solar receiver may comprise four groups of receiver panels which respectively correspond to a superheater, an evaporator, a reheater and a preheater.

Beside the illustrated embodiments variations are possible without leaving the scope of protection as defined by the dependent clauses. For example, the reflector element may be arranged with multi-layers, wherein an insulating layer is enclosed by two sheets, wherein at least one sheet has a reflecting surface. The reflector element may be flat shaped, but the outer surface may also be waved or otherwise curved, for example parabolic. In a further alternative embodiment the reflector element may be provided with additional elements.

Thus, according to the invention a solar receiver is provided having an improved effectiveness due to the presence of a transmission element behind a gap between two adjacent heat exchange tubes. Advantageously, the transmission element may increase the conversion from solar to thermal energy by the receiver panels and may additionally provide a cavity behind a receiver panel for erection, inspection, maintenance and repair of said panel or transmission element.

Further embodiments are defined in the following clauses with prefix 706:

706 1. Solar receiver (10) comprising at least one receiver panel (12), wherein the panel (12) has an outer front surface for receiving incident solar radiation and wherein the panel is formed by an array of heat exchange tubes (11), which are held together by a support (14) for arranging the heat exchange tubes substantially parallel and close to each other, characterized in that the panel comprises a transmission element (20) behind at least one gap between adjacent heat exchange tubes for transmitting heat or radiation to said adjacent heat exchange tubes.

706 2. Solar receiver according to clause 1, wherein the transmission element (20) behind the gab is a reflector element for reflecting incident solar radiation to the adjacent heat exchange tubes.

706 3. Solar receiver according to one of the clauses 1 or 2, wherein the reflector element (20) is plate shaped.

706 4. Solar receiver according to one of the preceding clauses, wherein the reflector element (20) is multilayered comprising an outer reflecting layer (23) having a reflecting surface for reflecting incident solar radiation and at least one inner insulating layer (22).

706 5. Solar receiver according to one of the preceding clauses, wherein the reflector element (20) is arranged in parallel with an insulating element (21).

706 6. Solar receiver according to one of the preceding clauses, wherein the reflector element (20) is spaced apart from the insulating element (21).

706 7. Solar receiver according to one of the preceding claims, wherein a cavity (24) is arranged in between the reflector element and the insulating element which is accessible for a human being.

706 8. Solar power tower (1) comprising at least one solar receiver (10) according to one of the preceding claims.

706 9. Solar power installation comprising a solar receiver (10) according to any of the claims 1-7 and at least one solar mirror (50), in particular a heliostat, for focussing and concentrating solar radiation.

706 10. Method for yielding electrical energy from solar energy on an industrial scale using a solar receiver, solar power tower or solar power installation according to one of the preceding claims.

Summarized, the invention relates in a second aspect to a solar receiver comprising at least one receiver panel. The panel has an outer front surface for receiving incident solar radiation. The panel comprises an array of heat exchange tubes. The heat exchange tubes are held together by a support for arranging the heat exchange tubes substantially parallel and close to each other. The solar receiver according to the invention is characterised in that the panel comprises a transmission element behind at least one gap between adjacent heat exchange tubes. During use of the solar receiver, solar radiation may get through a gap between heat exchange tubes and shine on the transmission element. According to the invention, the heat transmission element behind the gap reflects the solar radiation or emits the solar energy to the adjacent heat exchange tubes. FIG. 3A represents the second aspect of the invention.

In a third aspect 707, the present invention relates to a solar receiver comprising at least one receiver panel having an out of front surface for receiving incident solar radiation. The panel comprises an array of heat exchange tubes. The heat exchange tubes extend in a longitudinal direction and are connected by a mounting support to a framework. The framework is for example a structure of a solar power tower.

Such a solar receiver is for example suitable for a solar power installation as disclosed in EP 1873397 which discloses a solar power tower to generate electric power from sunlight by focussing concentrated solar radiation on a tower-mounted solar receiver. The solar power tower installation typically includes a "cold" storage tank, a solar receiver, heliostats, a "hot" storage tank, and an energy conversion system, such as a steam generator and turbine/generator set. In operation, a heat transfer fluid is pumped from the cold storage tank to the solar receiver. The solar receiver is typically positioned 50 feet to 250 feet or more above ground and is heated by the heliostats. The heliostats redirect and concentrate solar radiation from the sun onto the solar receiver, which converse solar energy from the incident sunlight to thermal energy. The heat transfer fluid flows through heat exchange tubes of the solar receiver where it is heated by the concentrated solar energy. The heat transfer fluid subsequently transports the thermal energy from the solar receiver to e.g. a steam generator to generate steam, wherein the thermal energy of the steam is used in a steam turbine/generator set to generate electricity. In case of Direct Steam Generation, the heat transfer fluid flowing through the solar receiver is water, wherein steam is directly generated in the solar receiver.

A similar solar receiver is known from a solar power installation which has been built on an industrial scale. The solar power installation has an electrical capacity of at least 5 MWe. The built solar power installation has a field of heliostats which surround a centrally positioned solar power tower. The solar power tower has a top with a height of approximately 80 meters. The solar receiver, comprising a plurality of receiver panels, is mounted in the upper region of the solar power tower. The receiver panels are arranged in groups at different height levels along a circumferential wall of the solar power tower. The groups of receiver panels are mounted above each other. The lowest group of receiver panels defines a superheater. The second group of receiver panels above the superheater defines an evaporator.

The known receiver panel comprises parallel arranged heat exchange tubes which are at both ends connected in a lower and an upper region to an input or output header. The input header distributes a supplied heat transfer fluid, e.g. water in the case of Direct Steam Generation, over the heat exchange tubes. The output header collects the heated fluid to supply it further to a next group of receiver panels, to a separator vessel or to the steam turbine.

The heat exchange tubes of the receiver panel have a straight main portion which is upwards, substantially vertically, arranged in an array. This array of main portions of the heat exchange tubes together form a panel. The straight main portions of the heat exchange tubes are at both sides provided with an inwards extending portion to get a U-shape configuration. The U-shape configuration gives a heat exchange tube a flexibility to expand in a controllable way. The inwards extending portions are single bended and directly connected to one of the headers. The inwards extending portion may give the main portion a freedom to expand and move in a longitudinal, here upwards, direction.

The input and output headers comprise a main conduit with connector organs which are arranged in an array in a length direction. Each heat exchange tube is by its inwards extending portion connected to a corresponding connector organ at the main conduit.

The receiver panels of the known solar receiver have an array of exchange tubes which are held together by a support for arranging the heat exchange tubes close to each other. The heat exchange tubes are kept close together, wherein an individual heat exchange tube is freely arranged to be movable relative to neighbouring heat exchange tubes. The heat exchange tubes are arranged as close as possible to each other to achieve an optimum exchange of heat. Gaps or spacers between the heat exchanges tubes are not desirable as these reduce the rate of conversion of solar to thermal energy by the solar receiver.

However, it is a problem that gaps between the heat exchange tubes are unavoidable.

Due to the insolation on the front surface of the heat exchange tubes, the heat exchange tubes will get a higher temperature at the front surface in comparison with the shaded backside of the heat exchange tubes. As a result the heat exchange tubes will bend outwards which cause enlarged gaps in between the heat exchange tubes.

The presence and enlargement of gaps is further enhanced by the concentration and focussing of solar radiation on the receiver panel in a solar spot. The solar spot causes a temperature maldistribution over the heat exchange tubes. The highest temperatures are reached in the middle of the solar spot, while the temperatures more outside are lower. Heat exchange tubes in the middle of the solar spot will get a higher temperature than heat exchange tubes more at the side of the receiver panel. This cause various thermal expansions of the heat exchange tubes in a traverse and longitudinal direction within the panel which brings further enlargements of the gaps between heat exchange tubes.

Also, tolerances in manufacturing of the panel initially cause gaps between the heat exchange tubes. Preferably, the width of a gap between two adjacent tubes is at most one millimeter after manufacturing in a steady state.

The gaps between the heat exchange tubes bring a loss of effectiveness, e.g. a reduction of conversion from solar to thermal energy, but may additionally cause problems in that components behind the receiver panel may get damaged. Components may be exposed to higher temperatures than they are designed for which results in reduction of life time or even failure. The high temperature behind the receiver panels in a solar power tower may bring further problems to service or inspect components of the solar power installation. To overcome these problems it has been tried to provide a kind of insulation means to shield of the components behind the solar receiver. However this solution has not been proved satisfying.

It is an object of the present invention to overcome at least one of the above-mentioned problems and/or to provide a useful alternative solution.

This aim is achieved by a solar receiver as defined by clause 707 1. The solar receiver according to the invention comprises at least one receiver panel having an outer front surface for receiving incident solar radiation. The panel is formed by an array of heat exchange tubes which extend in a longitudinal direction and are connected by a mounting support to a framework. The heat exchange tubes are arranged side by side. Preferably, the solar receiver according to the invention is designed for receiving redirected concentrated solar radiation from e.g. a field of heliostats.

The solar receiver according to the invention is characterized in that the support is connected to the heat exchange tube such that the support permits a free thermal expansion of the heat exchange tube in the longitudinal direction, and prohibits a deformation of the heat exchange tube in a transversal direction, as result of thermal expansion of the tubes. With respect to an individual heat exchange tube, the transversal direction may be defined as a radial direction. With respect to the receiver panel, the transversal direction may be defined as an in- or outward direction, but also a sideward direction. In particular the support prohibits a deformation of the heat exchange tube in an inward or outward direction which is substantially perpendicular to a plane formed by the panel. The heat exchange tubes are locally connected to a framework which means that the heat exchange tubes are freely arranged side by side over substantially the whole length of the heat exchange tubes.

Advantageously, the support according to the invention provides an improved control of deformations of the heat exchange tubes caused by thermal expansions. Those thermal expansions may normally result in deformations of the heat exchange tubes in all possible directions. In the solar receiver according to the invention, the heat exchange tubes mainly expand during use in a longitudinal direction, wherein the support may keep the heat exchange tubes within the plane formed by the receiver panel. Advantageously, the support may prohibit an undefined deformation of the heat exchange tube in a transversal direction. Uncontrolled thermal expansions of the receiver panel could have cause enlargements of gaps between heat exchange tubes. Herewith, by minimising the amount of gaps, the support according to the invention may contribute to an improved performance of the solar receiver. Due to the reduction of gaps, the solar receiver according to the invention including the improved support may increase the conversion of solar energy to thermal energy.

In an embodiment according to the invention, each individual heat exchange tube may be provided with an individual support. The individual support may permit an individual expansion of the individual heat exchange tube. The receiver panel may be subjected to a solar spot, which is an area of concentrated solar radiation on an outer surface. The solar spot may cause a high temperature gradient e.g. an uneven distributed heat flux over the area of the receiver panel. Due to the presence of the solar spot, each individual heat exchange tube may be subjected to a differing temperature profile. This may result in an individually differing expansion of each heat exchange tube. The occurrence and enlargement of gaps may be reduced by controlling the deformations of the individual heat exchange tube, caused by thermal expansions. This may, advantageously, increase the conversion from solar to thermal energy by the receiver panel.

In an embodiment of the solar receiver, the receiver panel comprises one single array of heat exchange tubes. The heat exchange tubes may be held locally side by side together instead of a fixation of adjacent heat exchange tubes which extends along a whole length of the heat exchange tubes. A group of upwards arranged heat exchange tubes may for instance be clamped together at a particular height level.

In a preferred embodiment of the solar receiver according to the invention the support comprises a fixation element for locally fixing at least one heat exchange tube and a guiding element for a locally guiding said at least one heat exchange tube in a longitudinal direction. A local fixation may for example be achieved by welding or a fastening by bolts. The fixation of a group of exchange tubes may be combined in one fixation element.

In an embodiment according to the invention, the fixation and guiding elements may be connected to a backside of the heat exchange tubes which advantageously does not disturb the side by side arrangement of the heat exchange tubes. The heat exchange tubes may be arranged directly side by side without an interference of the support. Herewith, advantageously, the connection at the backside may prevent the presence of gaps in between heat exchange tubes. This may further improve the conversion of solar to thermal energy.

Advantageously, the support according to the invention comprises an embodiment a fixation and a guiding element which are spaced apart from each other and connected to at least one heat exchange tube in a simple and effective manner.

Preferably, at least one guiding element, in particular at least two guiding elements are provided wherein the fixation elements and guiding elements may be equally spaced in a longitudinal direction of the heat exchange tube. Advantageously, a regular ordering of the elements may reduce the amount of deformation of the heat exchange tube in an inward or outward direction which may limit the total width of a gap in between to adjacent heat exchange tubes.

In a further preferred embodiment of the solar receiver according to the invention the fixation element is arranged at a first end of a heat exchange tube. The fixation element carries the vertical load of the heat exchange tubes. Preferably, the fixation element is arranged at an upper region of the heat exchange tube, wherein the guiding elements are arranged below the fixation element. The arrangement of the fixation element at one end of the heat exchange tube may be advantageous, because this may cause a predictable expansion of the heat exchange tube in a longitudinal direction away from the fixation element. A fixation in the upper region of an upwards disposed heat exchange element may result in a predictable controllable expansion of the heat exchange element in a downwards direction.

In an embodiment the guiding element may comprise a pin-slot construction, wherein the pin is moveable in the slot in a longitudinal direction of the heat exchange tube. In an alternative embodiment, the guiding element may be arranged as a clamp which permits a slip in a longitudinal direction of the heat exchange tube.

In a preferred embodiment of the solar receiver according to the invention the guiding element and/or fixation element of the support comprises a pair of bracket and a rod, wherein the rod is complementary to the bracket. The rod may be massive or tube shaped. The bracket may be formed by a bended pipe material or may have been manufactured out of a plate material.

Preferably, the bracket is connected to an individual heat exchange tube. The rod may extend through one or a group of brackets for limiting a deformation as a result of expansions in one direction of at least one heat exchange tube. The support may comprise e.g. an arm which extends from the framework to fix the rod. The framework may be a structure of a solar receiver. The rod may also be fixed to a reflector element or insulation element which may be arranged at the back side of the receiver panel.

In an embodiment according to the invention, the bracket may be L-shaped having a short leg and a long leg. The short leg may be fixed to a heat exchange tube. The long-leg of the bracket may extend substantially parallel to the heat exchange tube and define an opening between the heat exchange tube and the bracket which may enclose the complementary rod. The rod may be fixed to a framework. At least a main portion of the heat exchange tube may move relatively to the fixed rod as a result of an expansion in a longitudinal direction. Advantageously, the pair of bracket and rod may provide a simple embodiment for the guiding element. Herewith, the pair of the bracket and the rod provides a guiding element for the heat exchange tube.

In a possible embodiment of the solar receiver according to the invention the bracket of the guiding element encloses the rod in the longitudinal direction of the heat exchange tube with a predefined amount of clearance. The opening of the bracket may be a slot in a piece of plate which extends parallel to the heat exchange tube to give the heat exchange tube a freedom to move in the longitudinal direction with respect to the rod. In a further embodiment, a tip of the long leg of the L-shaped bracket may be inwards directed to obtain an enclosure of the rod in a longitudinal direction. Advantageously, the amount of clearance limits an expansion of the heat exchange tube to prevent a disconnection of the rod and bracket. Herewith, it may be assured that the support last longer under extreme circumstances.

In an embodiment according to the invention the guiding and/or fixation element of the support comprises a stopper for stopping a sideward movement of one or a group of heat exchange tubes. The stopper may limit a sidewards movement of the bracket. The stopper may be a pin, flange, groove etc. which may be fastened to the rod. In an embodiment according to the invention, the rod may be fixed to an arm, wherein the arm serves to fix the rod to e.g. the framework and at the same time serves as a stopper.

In an embodiment of the solar receiver according to the invention, the support comprises for each individual heat exchange tube an individual stopper. However, in a preferred embodiment a stopper may be provided for a group of at least four, preferably at least six, side by side arranged heat exchange tubes. The Inner arranged heat exchange tubes within the group may be enclosed in between the two outer arranged tubes which may provide a positioning of the inner tubes in a sideward direction. A bracket or additional counter stopper on the outer arranged heat exchange tubes of this group may hit the stopper. Preferably, the stopper hits against the bracket of the outer arranged heat exchange tube. Herewith, a sidewards movement of one or a group of heat exchange tubes may be prevented in a simple and effective manner.

Further, the invention relates to a solar power tower comprising a solar receiver according to the invention. The solar power tower may be arranged to yield electrical power from solar power on an industrial scale.

Besides the illustrated embodiments of the support and solar receiver according to the invention, many alternatives are possible without leaving the scope of protection which is defined by the appended clauses.

Thus, according to the invention a solar receiver is provided having an improved support to keep the heat exchange tubes substantially parallel arranged in an array. The support advantageously may prevent undefined deformations in transversal directions. The support may connect heat exchange tubes to a framework, wherein deformations resulting from thermal expansions may remain controllable and acceptable to achieve a high capacity of solar to electrical energy conversion.

Further embodiments of the solar receiver according to the invention are defined in the dependent clauses with prefix 707.

707 1. Solar receiver (10) comprising at least one receiver panel having a backside and an outer front surface for receiving incident solar radiation, wherein the panel comprises an array of heat exchange tubes which extend in a longitudinal direction and which are connected by a mounting support (14) to a framework (2), characterized in that the support (14) is connected to the heat exchange tubes such that the support permits a thermal expansion of the heat exchange tube in the longitudinal direction and prohibits a deformation of the heat exchange tube in a transversal direction.

707 2. Solar receiver according to clause 1, wherein the support comprises a fixation element for locally fixing at least one heat exchange tube and a guiding element for locally guiding said at least one heat exchange tube in a longitudinal direction.

707 3. Solar receiver according to clause 1 or 2, wherein the fixation element is arranged at a first end of said heat exchange tube.

707 4. Solar receiver according to one of the preceding clauses, wherein at least one guiding element and the fixation element are equally spaced in a longitudinal direction of said heat exchange tube.

707 5. Solar receiver according to one of the preceding clauses, wherein at least two guiding elements are arranged along a length of said heat exchange tube.

707 6. Solar receiver according to one of the preceding clauses, wherein the guiding element and/or fixation element of the support comprises a pair of a bracket and a rod.

707 7. Solar receiver according to one of the preceding clauses, wherein either the bracket or the rod is fixed to said heat exchange tube and wherein the complementary rod or bracket is fixed to the framework, wherein the rod extends through the bracket for limiting a deformation of the heat exchange tube in one direction, in particular an in- or outward direction of the receiver panel.

707 8. Solar receiver according to one of the preceding clauses, wherein the bracket of the guiding element encloses the rod in the longitudinal direction of the heat exchange tubes with an amount of clearance.

707 9. Solar receiver according to one of the preceding clauses, wherein the guiding and/fixation element of the support comprises a stopper for limiting a sideward deformation of a heat exchange tube, in particular a group of heat exchange tubes.

707 10. Solar receiver according to one of the preceding clauses, wherein the stopper is designed for stopping a group of at least 4, preferably at least 6, heat exchange tubes.

707 11. Solar receiver according to one of the preceding clauses, wherein the stopper engages to a counter stopper, in particular the bracket, which is mounted to the group of heat exchange tubes.

707 12. Solar power tower (1) comprising at least one solar receiver (10) according to one of the preceding clauses.

707 13. Solar power installation comprising at least one solar receiver (10) according to any of the clauses 1-11 and at least one solar mirror (50), in particular a heliostat, for focussing and concentrating solar radiation.

707 14. Method for yielding electrical energy from solar energy on an industrial scale using a solar receiver, solar power tower or solar power installation according to one of the preceding clauses.

Summarized, in a third aspect the invention relates to a solar receiver comprising at least one receiver panel having an out of front surface for receiving incident solar radiation. The panel is formed by an array of heat exchange tubes. The heat exchange tubes extend in a longitudinal direction and are connected by a mounting support to a framework. The solar receiver according to the invention is characterized in that the support is connected to the heat exchange tube such that the support permits a free thermal expansion of the heat exchange tube in the longitudinal direction, and prohibits a deformation of the heat exchange tube in a transversal direction, as result of thermal expansion of the tubes. The heat exchange tubes are locally connected to a framework which means that the heat exchange tubes are freely arranged site by site over substantially the whole length of the heat exchange tubes. FIG. 5 represents the third aspect of the invention.

In a fourth aspect 709, the present invention relates to a solar receiver comprising at least two adjacent receiver panels having an outer front surface for receiving incident solar radiation, wherein a receiver panel comprises side by side positioned substantially straight main portions of heat exchange tubes which extend in a longitudinal direction and are connected to a header for carrying heat transfer fluid to or from the heat exchange tubes, wherein said header extends in a transversal direction with respect to the heat exchange tubes, and wherein said receiver panel comprises a main panel of heat exchange tubes whose straight main portions cross said header in a front projection.

Such a solar receiver is for example suitable for a solar power installation as disclosed in EP 1873397 which discloses a solar power tower to generate electric power from sunlight by focussing concentrated solar radiation on a tower-mounted solar receiver. The solar power tower installation typically includes a "cold" storage tank, a solar receiver, heliostats, a "hot" storage tank, and an energy conversion system, such as a steam generator and turbine/generator set. In operation, a heat transfer fluid is pumped from the cold storage tank to the solar receiver. The solar receiver is typically positioned 50 feet to 250 feet or more above ground and is heated by the heliostats. The heliostats redirect and concentrate solar radiation from the sun onto the solar receiver, which converse solar energy from the incident sunlight to thermal energy. The heat transfer fluid flows through heat exchange tubes of the solar receiver where it is heated by the concentrated solar energy. The heat transfer fluid subsequently transports the thermal energy from the solar receiver to e.g. a steam generator to generate steam, wherein the thermal energy of the steam is used in a steam turbine/generator set to generate electricity. In case of Direct Steam Generation, the heat transfer fluid flowing through the solar receiver is water, wherein steam is directly generated in the solar receiver.

A similar solar receiver is known from a solar power installation which has been built on an industrial scale. The solar power installation has an electrical capacity of at least 5 MWe. The built solar power installation has a field of heliostats which surround a centrally positioned solar power tower. The solar power tower has a top with a height of approximately 80 meters. The solar receiver, comprising a plurality of receiver panels, is mounted in the upper region of the solar power tower. The receiver panels are arranged in groups at different height levels along a circumferential wall of the solar power tower. The groups of receiver panels are mounted above each other. The lowest group of receiver panels defines a superheater. The second group of receiver panels above the superheater defines an evaporator.

The known receiver panel comprises parallel arranged heat exchange tubes which are at both ends connected in a lower and an upper region to an input or output header. The input header distributes a supplied heat transfer fluid, e.g. water in the case of Direct Steam Generation, over the heat exchange tubes. The output header collects the heated fluid to supply it further to a next group of receiver panels, to a separator vessel or to the steam turbine.

The heat exchange tubes of the receiver panel have a straight main portion which is upwards, substantially vertically, arranged in an array. This array of main portions of the heat exchange tubes together form a panel. The straight main portions of the heat exchange tubes are at both sides provided with an inwards extending portion to get a U-shape configuration. The U-shape configuration gives a heat exchange tube a flexibility to expand in a controllable way. The inwards extending portions are single bended and directly connected to one of the headers. The inwards extending portion may give the main portion a freedom to expand and move in a longitudinal, here upwards, direction.

The input and output headers comprise a main conduit with connector organs which are arranged in an array in a length direction. Each heat exchange tube is by its inwards extending portion connected to a corresponding connector organ at the main conduit.

The receiver panels of the known solar receiver have an array of exchange tubes which are held together by a support for arranging the heat exchange tubes close to each other. The heat exchange tubes are kept close together, wherein an individual heat exchange tube is freely arranged to be movable relative to neighbouring heat exchange tubes. The heat exchange tubes are arranged as close as possible to each other to achieve an optimum exchange of heat. Gaps or spacers between the heat exchanges tubes are not desirable as these reduce the rate of conversion of solar to thermal energy by the solar receiver.

Known solar receivers which are installed on a solar power tower, generally have a horizontal square or polygonal cross section including side walls and corner walls. A problem to the known solar receivers is that it has areas which are not covered by heat exchange tubes. The walls are provided with flat receiver panels, wherein open spaces are left between adjacent walls. In particular the open spaces between the walls and the adjacent panels, in particular in the corners of the cross section, bring problems. Due to nature of the solar power tower, received incident solar radiation exceeds the boundaries of a receiver panel as a result of focussing inaccuracies of the heliostats on the solar receiver. Solar radiation which falls at the open spaces between the walls and adjacent panels, in particular in the corners of the cross section, may cause undesired high temperatures besides and behind the adjacent receiver panels. The high temperatures may damage components, like headers and other components of the solar power installation behind the receiver panels.

The above-mentioned problems have been partially solved in the prior art by arranging ceramic shields in front of the solar receiver. The ceramic shields have been arranged along the vertical boundaries of the receiver panels to cover the open spaces in between adjacent receiver panels and to protect the area behind the receiver panels against solar radiation.

In a known solar receiver, auxiliary receiver panels have been arranged at the vertically extending open spaces between adjacent receiver panels. Herewith, advantageously, the total conversion of solar energy may be increased. The auxiliary receiver panels comprise auxiliary heat exchange tubes which are connected to auxiliary headers. The auxiliary receiver panels may also be exposed to solar radiation, wherein the solar energy is converted to thermal energy.

However, in practice, the ceramic shields and auxiliary receiver panels have been proved to be still not satisfying.

A first drawback of the shields is that solar radiation is reflected back to the environment. In particular as a result of a lack of cooling, the shield might get a high temperature which might result in a too high emission of thermal radiation to the environment. A second drawback of the shields is that the combination of high temperatures together with a daily start-stop operation might strongly reduce the life time of the brittle ceramic shields. Summarized, the presence of shields means a loss of solar energy and therefore a strong reduction of a capability to convert solar energy into thermal energy.

Generally, the auxiliary receiver panels are integrated in the solar receiver as supplementary evaporators. These supplementary evaporator receiver panels may be arranged in between groups of receiver panels which groups correspond to superheater, reheater or preheater sections. This has a drawback that a lot of additional piping is required to connect the supplementary evaporator panels to the main evaporator system.

It is an object of the present invention to overcome the above mentioned drawbacks, at least partly, and/or to provide a useable alternative.

This object is achieved by a solar receiver according to the invention as defined in clause 1 with prefix 709.

Preferably, the solar receiver according to the invention is designed for receiving redirected concentrated solar radiation from e.g. a field of heliostats. The solar receiver according to the invention comprises at least two adjacent receiver panels having an outer front surface for receiving incident solar radiation. Preferably, the receiver panels are substantially flat. At least one of the receiver panels comprises side by side positioned substantially straight main portions of heat exchange tubes which extend in a longitudinal direction. The substantially straight main portions are connected to a header for carrying heat transfer fluid, e.g. water to or from the heat exchange tubes. The header extends in a transversal direction with respect to the heat exchange tubes. The receiver panel comprises a main panel of heat exchange tubes whose substantially straight main portions crosses in a front projection said header. The header may be smaller or may have the same width as the main panel. The header may be arranged behind the main panel.

The solar receiver according to the invention is characterised in that the receiver panel further comprises at least one side panel of auxiliary heat exchange tubes whose substantially straight main portions are in a front projection positioned beside said header. In a front view, the auxiliary heat exchange tubes may extend beside the header such that the side panel is arranged beside the header to form a side panel. The auxiliary heat exchange tubes may have a substantially straight main portion and at least one inwards extending portion for connecting the auxiliary heat exchange tubes to the header.

Advantageously, the solar receiver according to the invention functionally integrates at least one side panel into the main panel to obtain functionally one receiver panel. The receiver panel including the main and side panel may e.g. serve as a preheater, a superheater, a reheater or an evaporator. Herewith, a side panel may fully contribute to the yielding of thermal energy. The received incident solar radiation by the side panel is thereby effectively added to the thermal energy produced in the solar receiver.

A second advantage may be that solar radiation which falls outside the boundaries of the main panel may still fall onto the side panel of the solar receiver which also contributes to the conversion of solar energy into thermal energy. Open spaces around the circumference of the main panel may be covered by the side panel which may advantageously protect components behind the receiver panel and may make additional shields unnecessary. A further advantage may be the reduction of components. No additional headers or other connecting conduits, piping or ceramic shields are needed to obtain an increase in conversion from solar to thermal energy. Especially, the absence of ceramic shields may give advantageously less risks on damages and may reduce labour for servicing.

In a particular embodiment according to the invention, the auxiliary heat exchange tubes may form a substantially flat side panel which may be angled arranged with respect to the receiver panel. This angled side receiver panel may be called a corner panel. The side panel may be angular positioned, in particular at least 10°, with respect to the main panel. Advantageously, the angular positioned side panel provides an opportunity to assemble a series of receiver panels around a whole circumference, wherein open spaces may be reduced to a minimum. The solar receiver is in particular suitable for mounting it on a solar power tower having a polygonal cross section. The angled positioned side panel including side by side positioned heat exchange tubes may advantageously cover open spaces at a corner wall which advantageously may increase the solar effectiveness.

In an embodiment of the solar receiver according to the invention, the heat exchange tubes comprises at least one inwards extending portion for connecting the heat exchange tube to a header. Said header may comprise a main conduit including an array of connector organs e.g. arranged as an array of holes or pieces of a pipe, for connecting an array of heat exchange tubes to the header. A connector organ may for example be a hole in the main conduit, wherein the diameter of the hole corresponds with an outer diameter of the heat exchange tubes. The heat exchange tubes may we welded to the holes.

Preferably, the main conduit is pipe shaped having a circular cross section. The main conduit may have an axial direction which extends transversally to the longitudinal direction defined by the main portions of the heat exchange tubes. At least two arrays of connector organs may be arranged in parallel which arrays extend in an axial direction of the main conduit.

A header having a main conduit with a second array of connector organs may provide several advantages. The headers having at least two arrays of connector organs may provide a first advantage in that the second array of connector organs may give an opportunity to connect easily some auxiliary heat exchange tubes to the header. Advantageously, the second array of connector organs permits a simple shape of the auxiliary heat exchange tubes without complex bends. The simple configuration of the heat exchange tubes may advantageously provide a cost effective manufacturing and assembling of the heat exchange tubes.

In an embodiment of the solar receiver according to the invention, connector organs may be arranged in a first array which may be staggered positioned in an axial direction with respect to connector organs in a second array. The staggered positioned connector organs provide staggered positioned heat exchange tubes. The inwards extending portion may be welded to the header. A welding seam occurs at the position of the connector organ. The welding seam for each connection requires an amount of space. The staggered arrangement of connector organs minimizes this space in sideward direction which is favourable in getting the heat exchange tubes close to each other in a sidewards direction. The close arrangement may result in a reduction of gaps in between heat exchange tubes, which may advantageously increase the capacity of the solar receiver and may reduce the risk on damages of components behind the solar receiver.

In a further preferred embodiment according to the invention the header of the solar receiver comprises three arrays of connector organs in parallel. The connector organs of two arrays may be staggered arranged to obtain a gaps reducing effect, wherein the third array may be provided to connect auxiliary heat exchange tubes to form a side panel to reduce open spaces beside the receiver panel.

In an embodiment according to the invention the solar receiver comprises a substantially vertically arranged receiver panel, wherein the receiver panel comprises U-shaped heat exchange tubes. The heat exchange tubes have a substantially straight main portion which comprises at both ends an inwards extending portion.

The main straight portions may be arranged upwards. A first inwards extending portion at the upper end of the main straight portions connects the heat exchange tube to a first header. A second inwards extending portion at the lower end of the main straight portion connects the heat exchange tube at a second header. The first header is arranged above the second header. The first header is arranged above or at least at the same height level of the upper end of the main straight portion and the second header is arranged below or at least at the same height level of the lower end of the main straight portion to obtain a by gravity drainable configuration. If the contents of the receiver panel needs to be discharged, the heat transfer fluid can flow freely downwards from the first header to the second header. After a drain operation no or hardly no fluid remains in the heat exchange tube.

Besides the illustrated embodiment according to the invention, many variants are possible without leaving the scope of protection defined by the appended clauses. In a variant of the shown embodiment in FIG. 6 several headers may e.g. be combined to a larger header. The A and B receiver panels may be combined into one integral AB receiver panel.

Thus, according to the invention a solar receiver is provided with receiver panels having main and side panels which may give a continuous covering of the circumference by side to side heat exchanger tubes, without open spaces in between adjacent receiver panels. A configuration of a group of receiver panels may be obtained having minimized open spaces or gaps in between the tubes. This may advantageously increase the conversion rate of solar to thermal energy by the solar receiver.

Further embodiments according to the invention are described in the dependent clauses with prefix 709.

The invention further relates to a solar power tower as defined in clause 709_10.

Further, the invention relates to a solar power installation and method for yielding electrical energy from solar energy comprising a solar receiver according to the invention:

709 1. Solar receiver comprising at least two adjacent receiver panels having an outer front surface for receiving incident solar radiation, wherein a receiver panel comprises side by side positioned substantially straight main portions of heat exchange tubes which extend in a longitudinal direction and are connected to a header for carrying heat transfer fluid to or from the heat exchange tubes, wherein said header extends in a transversal direction with respect to the heat exchange tubes, wherein said receiver panel comprises a main panel of heat exchange tubes which cross in a front projection said header, characterised in that the receiver panel further comprises a side panel of auxiliary heat exchange tubes whose substantially straight main portions are in a front projection positioned beside said header.

709 2. Solar receiver according to clause 1, wherein the main panel and the side panel are substantially flat, wherein said side panel is angular positioned, in particular at least 10°, with respect to the main panel.

709 3. Solar receiver according to clause 1 or 2, wherein the heat exchange tubes comprises at least one inwards extending portion for connecting the heat exchange tube to a header, said header comprises a main conduit including an array of connector organs for connecting the array of heat exchange tubes to the header, wherein at least two arrays of connector organs are arranged in parallel which arrays extend in an axial direction of the main conduit.

709 4. Solar receiver according to one of the preceding clauses, wherein the header comprises connector organs in a first array which are staggered positioned in axial direction with respect to connector organs in a second array.

709 5. Solar receiver according to one of the preceding clauses, wherein the header comprises three arrays of connector organs in parallel, wherein the connector organs of two arrays are staggered arranged, wherein the third array is provided for connecting auxiliary heat exchange tubes to form a side panel.

709 6. Solar receiver according to one of the preceding clauses, wherein the solar receiver comprises a substantially vertically arranged receiver panel, wherein the receiver panel comprises U-shaped heat exchange tubes having upwards arranged main straight portions and a first inwards extending portion at an upper end of the main straight portions to connect the heat exchange tube to a first header and a second inwards extending portion at a lower end of the main straight portion to connect the heat exchange tube at a second header, wherein the first header is arranged above the second header and wherein the first header is arranged above or at least at the same height level of the upper end of the main straight portion and the second header is arranged below or at least at the same height level of the lower end of the main straight portion, such that the receiver panel is drainable by gravity.

709 7. Solar receiver according to clause 6, wherein the first inwards extending portion extends downwards or horizontal from the first header and wherein the second inwards extending portion extends downwards or horizontal to the second header.

709 8. Solar receiver according to any of the preceding clauses, wherein the solar receiver comprises a substantially flat panel A, a one sided curved panel B and/or a two sided curved panel C.

709 9. Solar receiver comprising a framework having a polygonal cross section and at least one substantially flat side wall, wherein at least one receiver panel according to one of the preceding clauses is mounted to said side wall.

709 10. Solar power tower comprising at least one solar receiver according to one of the preceding clauses.

709 11. Solar power installation comprising a solar receiver (10) according to one of the clauses 1-9 and at least one solar mirror (50), in particular a heliostat, for redirecting, focussing and concentrating solar radiation.

709 12. Method for yielding electrical energy from solar energy on an industrial scale using a solar receiver, solar power tower or solar power installation according to one of the preceding clauses.

Summarized, according to the fourth aspect, the solar receiver comprising at least two adjacent receiver panels having an outer front surface for receiving incident solar radiation. Said receiver panel comprises side by side positioned substantially straight main portions of heat exchange tubes which extend in a longitudinal direction and are connected to a header for carrying heat transfer fluid to or from the heat exchange tubes, wherein said header extends in a transversal direction with respect to the heat exchange tubes, wherein said receiver panel comprises a main panel of heat exchange tubes which cross in a front projection said header. The solar receiver is improved in that the receiver panel further comprises a side panel of auxiliary heat exchange tubes whose substantially straight main portions are in a front projection positioned beside said header. FIG. 6 represents the fourth aspect of the invention.

The invention will be explained in more detail with reference to the appended drawings which illustrate a practical embodiment of the invention, but should not be regarded as limiting, wherein:

DETAILED DESCRIPTION OF THE INVENTION

The invention relates to the field of yielding electrical energy from solar energy on an industrial scale. Several concepts of yielding electrical energy from solar energy exist. In a particular concept, solar energy is converted into thermal energy by focussing solar radiation on a solar receiver. The thermal energy is used to generate superheated steam in the solar receiver. The thermal energy from the superheated steam is then converted in a steam turbine/generator set into electrical energy.

Figure 1:
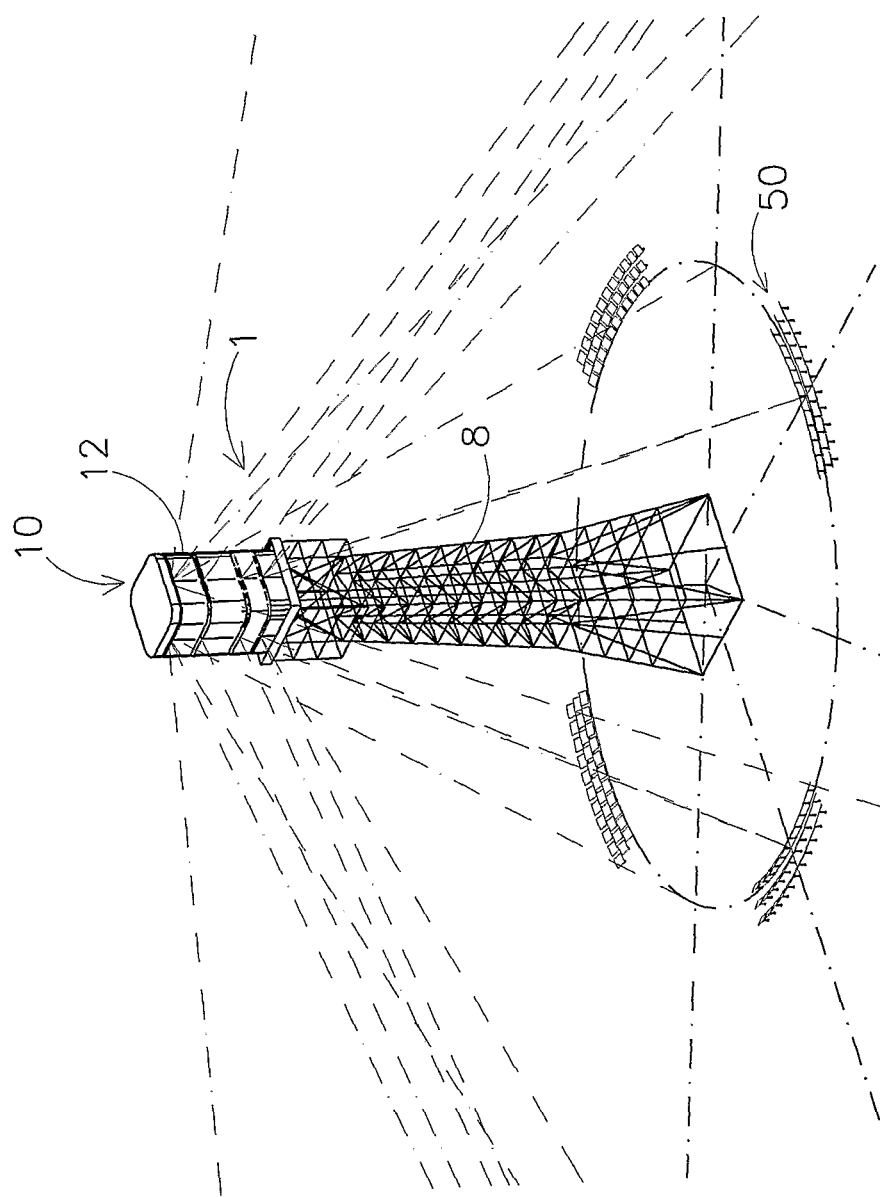
FIG. 1 shows a three dimensional view of a solar power installation.

FIG. 1 shows an overview of a solar power installation. The solar power installation comprises a field of heliostats 50 which are positioned around a solar power tower 1, also called a central receiver. The solar power tower 1 may be centrally positioned but may also be arranged at a side of the field of heliostats 50. The solar power tower 1 has a top height of about 150 meters.

The solar power tower 1 has a steel structure 8 which is assembled from steel bars. In the upper region of the steel structure 8 a solar receiver 10 is located. On the circumferential outer wall of the solar receiver 10 a plurality of receiver panels 12 is mounted. The heliostats 50 redirect sunlight, focus and concentrate solar radiation on the receiver panels 12 at a top of the solar power tower. All the heliostats together cause an area of concentrated solar radiation, a solar spot, on an outer surface of the receiver panel 12. The solar spot causes a high temperature gradient, resp. an uneven distributed heat flux, over the area of the receiver panel. During use of the solar power installation, the heliostats 50 move in dependency with the orientation of the sun to keep a focus on the solar receiver.

Figure 2A:
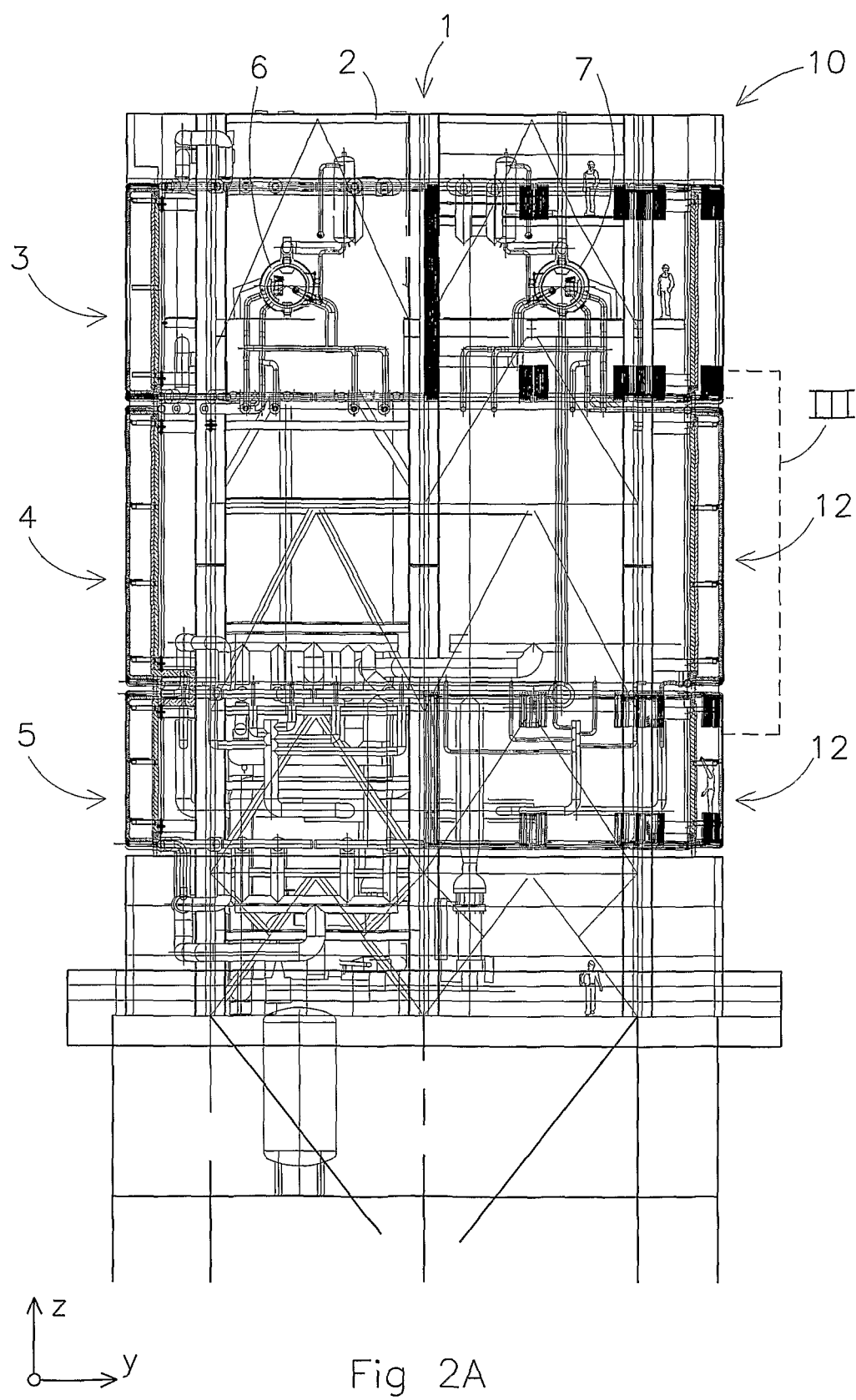
FIG. 2A shows a side view of a solar receiver according to the invention.
Figure 2B:
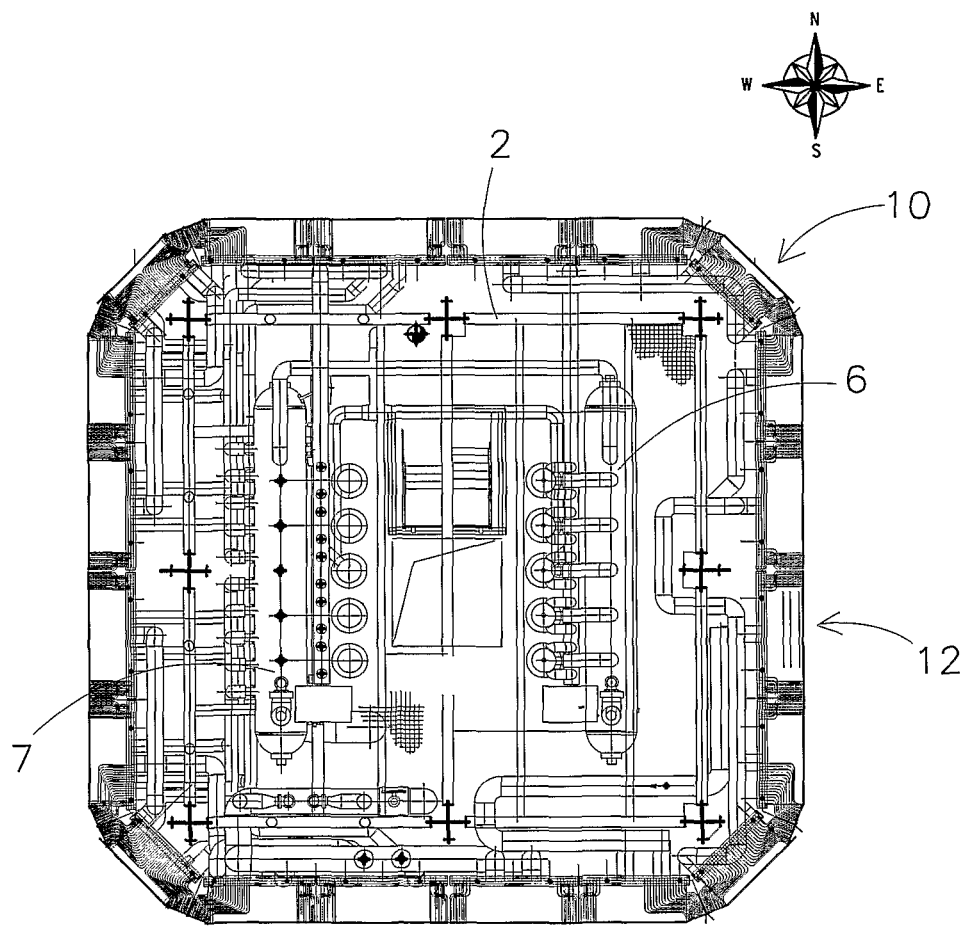
FIG. 2B shows a top view of the solar receiver out of FIG. 1.

FIG. 2A and FIG. 2B show corresponding side and top views of a solar receiver 10 which is designed to be centrally positioned. The solar receiver 10 has a circumferential wall which is covered with a plurality of receiver panels and has an approximately square cross section. The cross section has a width of about 20 meters. An orthogonal coordinate system having an X, Y and Z axis may be defined by the height and cross section of the solar receiver 10. The height direction defines the Z-axis, wherein the cross section defines a plane formed by the X and Z axis. The square cross sectioned has four side walls, wherein the corners are chamfered which results in four corner walls. Receiver panels 12 are provided along the whole circumference of the cross section.

The framework 2 has a hollow space to provide a space for mounting inner components of the solar receiver. FIGS. 2A and 2B show for example two inner arranged separator vessels 6, 7 for separating a mixture of water and steam. The separator vessels 6, 7 are arranged in the top of the solar receiver 10. The separator vessels 6, 7 are arranged at the same height level as the super heater 3. The separator vessels 6, 7 extend in a substantially horizontal direction.

The solar receiver 10 wherein receiver panels 12 are arranged may be subdivided in three height levels for three groups of receiver panels. The receiver panels 12 are arranged along the circumference wall of the solar receiver 10. The most upper arranged group of receiver panels 12 may function as a super heater 3. The group of receiver panels which is placed in a middle position may function as an evaporator 4. A lower arranged group of receiver panels may be arranged to function as a reheater 5. The super heater 3, the evaporator 4 and the reheater 5 are disposed close to each other. Just a small substantially horizontally extending space of at most 50 cm in height may be left in between adjacent groups of receiver panels. The super heater 3 has a height of about 7 meters. The evaporator 4 has a height of about 9 meters and the reheater 5 has a height of about 5 meters.

Figure 3A:
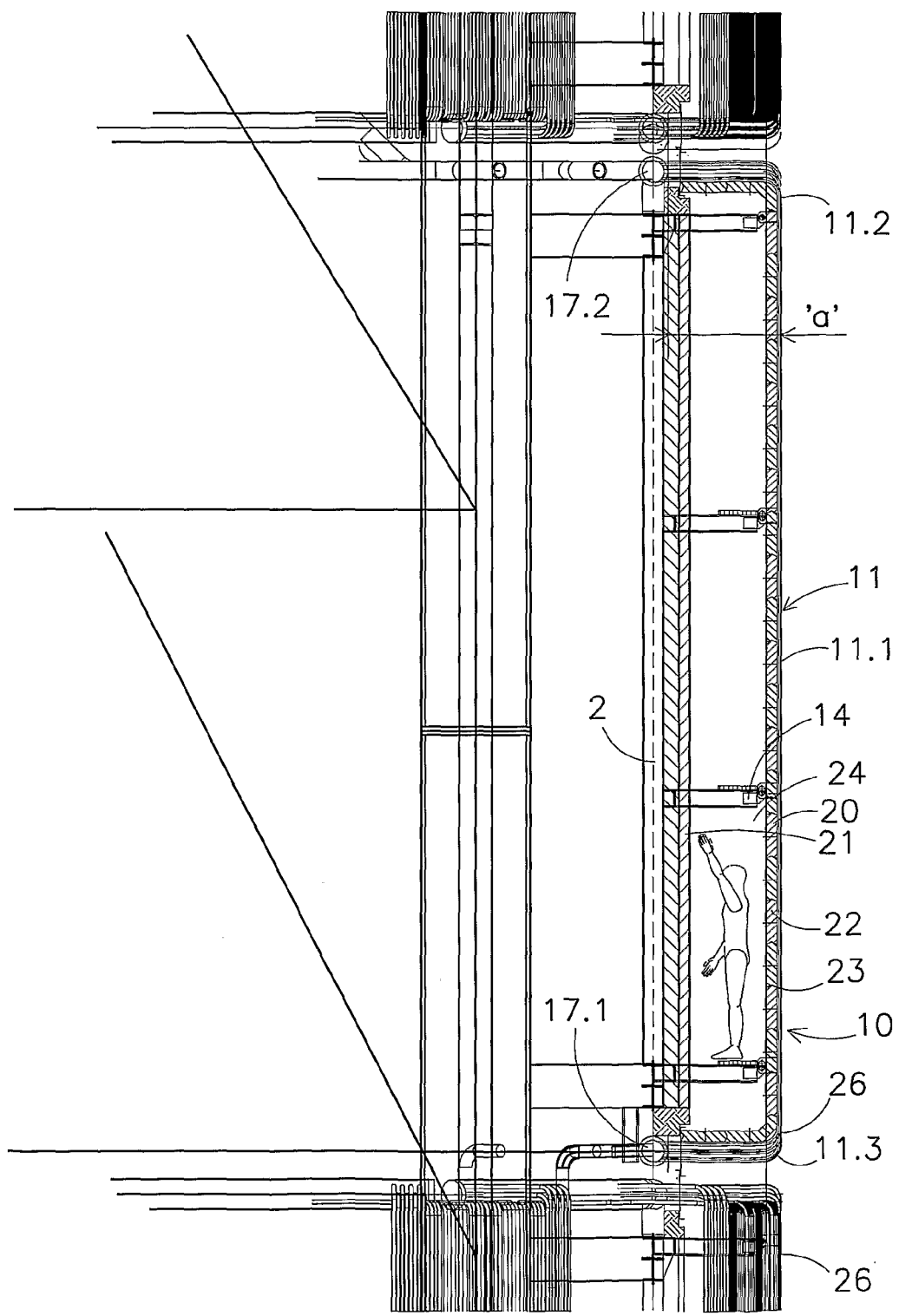
FIG. 3A shows in a side view a receiver panel in more detail.
Figure 3B:
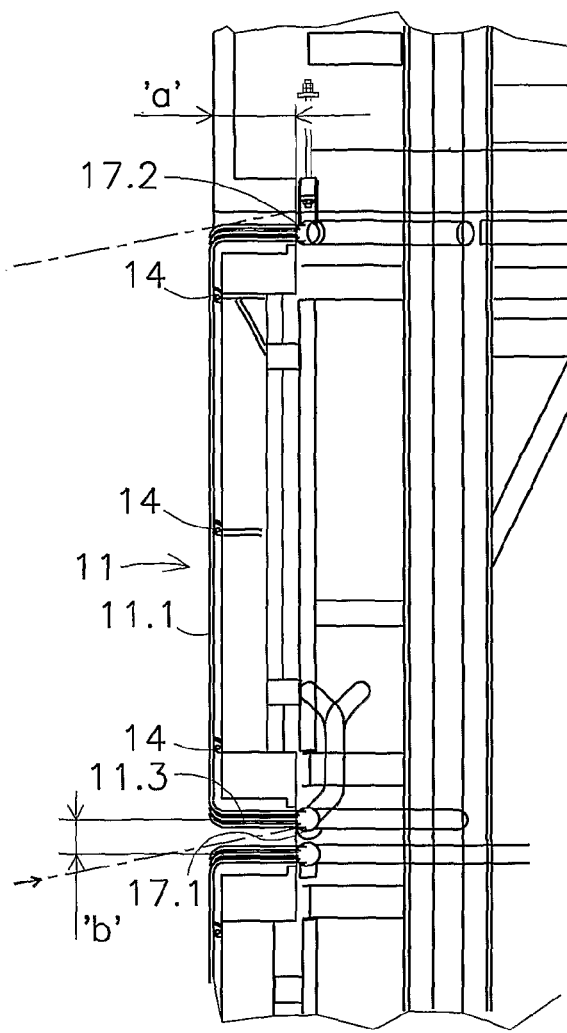
FIG. 3B shows in a side view a receiver panel in more detail.

FIGS. 3A and 3B show the receiver panel 12 in a more detailed side view in cross section. The receiver panel 12 has a backside and an outer front surface for receiving incident solar radiation. The solar receiver 10 comprises a receiver panel 12 which is formed by an array of heat exchange tubes 11. The heat exchange tubes 11 are arranged in parallel in a single array.

The receiver panel 12 is at the backside mounted to a framework 2 of the solar receiver 10. A support 14 is provided to mount the receiver panel 12 to the framework 2 of the solar power tower 1. The support 14 is arranged to carry the vertical loads of the heat exchange tubes and to keep the heat exchange tubes 11 in parallel. The heat exchange tubes 11 are positioned side by side close to each other to minimise a possible gap in between two adjacent heat exchange tubes. Gaps or chinks between adjacent heat exchange tubes are unfortunately unavoidable, because of the occurring high temperature gradient caused by the solar spot and because of the fact that the heat exchange tubes 11 are never exactly straight. There is always a certain amount of clearance between two neighbouring heat exchange tubes which may result in a small gap of at most 2 mm, in particular at most 1 mm.

The support 14 connects a receiver panel 12 to the framework 2. The support 14 has an arm which extends from the framework 2 through a transmission element 20 to the solar receiver. The heat exchange tube 11 may freely expand in the longitudinal direction in between the substantially equally spaced components of the support 14. The support 14 will be further illustrated in FIG. 5.

The heat exchange tube 11 comprises a straight main portion 11.1 having at both ends an inwards extending portion 11.2, 11.3 to get a U-shape configuration. The U-shape configuration gives a heat exchange tube a flexibility to expand in a controllable way. The inwards extending portions are bended inwards in one bend and directly connected via a substantially straight part to one of the headers. The inwards extending portion 11.2, 11.3 may give the main portion a freedom to expand and move in a longitudinal, here upwards, direction. Herewith, a risk on undefined deformations of the main portion may be reduced. For start and stop proceedings of the solar power installation, it may be important that all fluid in the receiver panels can be drained away to empty the receiver panels. The U-shaped configuration of the heat exchange tubes has only horizontal or downwards extending heat exchange tubes which makes the receiver panel drainable.

The straight main portion 11.1 may have a length of for example 5 or 7 meters. The inwards extending portion 11.2, 11.3 may have a length 'a' of at least 80 cm, in particular at least 100 cm, but preferably at least 110 centimeters. The length of the inwards extending portion is designed in dependency of the angle of direct incident solar radiation. For instance, neighbouring receiver panels, a distance of a heliostat and a height of a solar power tower may define an angle of incident solar radiation. The length of the inwards extending portion is such that no or hardly no direct radiation passes the extending portion.

FIG. 3B shows two receiver panels above each other. The receiver panels are spaced apart from each other. A space between the solar receivers has a height 'b' of at least 30 cm, preferably 40 cm and at most 50 cm. A strike-dot line towards the front surface of the solar receiver indicates an angle of solar radiation. In this design hardly no direct solar radiation will reach components behind the heat exchange tubes. This design may reduce a risk on damage to components like conduits and headers behind the solar receiver. Advantageously, no ceramic tiles or sheets in front of the receiver panels are necessary.

The heat exchange tube 11 is at both ends connected to a header. The upper end (11, 2) of the heat exchange tube is connected to an outlet header 17.2 the lower end (11, 3) is connected to an input header 17.1. A vice versa arrangement is also possible. As shown in FIG. 3A the headers may be arranged at a distance 'a' of at least 1 meter behind the front surface of the receiver panel. The headers 17.1, 17.2 extend in a sidewards, substantially horizontal direction and comprise a main conduit. The main conduit is designed to collect or distribute supplied heat transfer fluid, preferably steam or water, from or into the heat exchanger tube. The main conduit is provided with connector organs for connecting a heat exchange tube to the main conduit. A simple embodiment of a connector organ may be a hole. A heat exchange tube may be welded into the hole to get the heat exchange tube in fluid communication with the main conduit.

As shown in FIGS. 3A and 3B the connector organs may be arranged at different height levels to the main conduit. The connector organs may be staggered arranged in height direction. After connecting the heat exchange tubes 11 the inwards extending portions 11.2, 11.3 also stagger in height direction. After assembly, the inwards extending portions 11.2, 11.3 of the heat exchange tubes may be arranged in an overlapping manner in height direction.

The staggering connector organs may reduce gaps between adjacent heat exchange tubes. The inwards extending portions 11.2, 11.3 may be formed by a bend in the heat exchange tube 11. The staggered connector organs create space to make welding seams to connect the inwards extending portions of the heat exchange tubes 11 to the main conduit of the header. Herewith, the staggered connector organs in stead of aligned connector organs advantageously less disturb a close arrangement of the array of heat exchange tubes.

FIG. 3A shows further a transmission element as a reflector element 20 which is arranged at the backside of the heat exchange tubes 11. The front side of the heat exchange tube 11 is exposed to redirected incident solar radiation. The shown receiver panel 12 is formed by just one single array of heat exchange tubes. The reflector element 20 is double layered. A first layer at the outer side comprises a reflecting surface 23. The reflecting surface 23 reflects incident solar radiation which shines through a possible gap in between two adjacent heat exchange tubes 11 to the backside of the heat exchange tubes. The outer layer 23 is formed by a sheet out of steel, preferably stainless steel. Behind the double layered reflector element, a cavity is provided which offers access for a human being. Herewith, the cavity 24 gives space for installation, maintenance, inspection, repair etc. of the receiver panel 12 and the reflector element 20. At the opposite of the cavity an insulation element 21 is provided. The insulation element 21 is mounted to the framework 2.

The heat exchange tubes may further be provided with a shield 26 to improve the protection against solar radiation. In FIG. 3B several shielding plates are shown which are connected to the inwards extending portions 11.3. The shield may be welded to the inwards extending portion. Preferably, the shield is plate shaped. The shield may be of a ceramic material, but preferably the shield is made of stainless steel. The shield of stainless steel comprises advantageously a reflection surface for reflecting incident solar radiation and good heat resistance properties. The incident solar radiation may be reflected towards a neighbouring heat exchange tube which advantageously increase the heat exchange capacity of the heat exchange tube.

In an alternative embodiment, the shield may be black coloured which increased the conversion of solar energy to thermal energy. The shield 26 may be made of the same material as the heat exchange tube, which provides good welding properties.

The shield 26 may be plate shaped and connected to a group of inwards extending portions. The shield may be connected to side by side arranged inwards extending portions of heat exchange tubes. One shield 26 may be divided in several sections to allow for different thermal expansion of the shield itself relative to the main conduit of the header. A plurality of shields may be provided to protect the header 17.1 from solar radiation. As shown in FIG. 3A, the shields 26 from adjacent receiver panels are spaced apart from the header at different distances, which allows an overlapping arrangement of the shields. The overlap between neighbouring shields, advantageously, improves the protection against, in particular indirect, incident solar radiation.

In an embodiment, the shield 26, which is also shown in FIG. 7, may be plate shaped, wherein a staggered pattern of holes are provided which allows heat exchange tubes from one receiver panel to pass through the shield. The shield may have shield sections which allow a relative movement of the shield sections as a result of different expansions the shield itself and the main conduit of the header.

Figure 5:
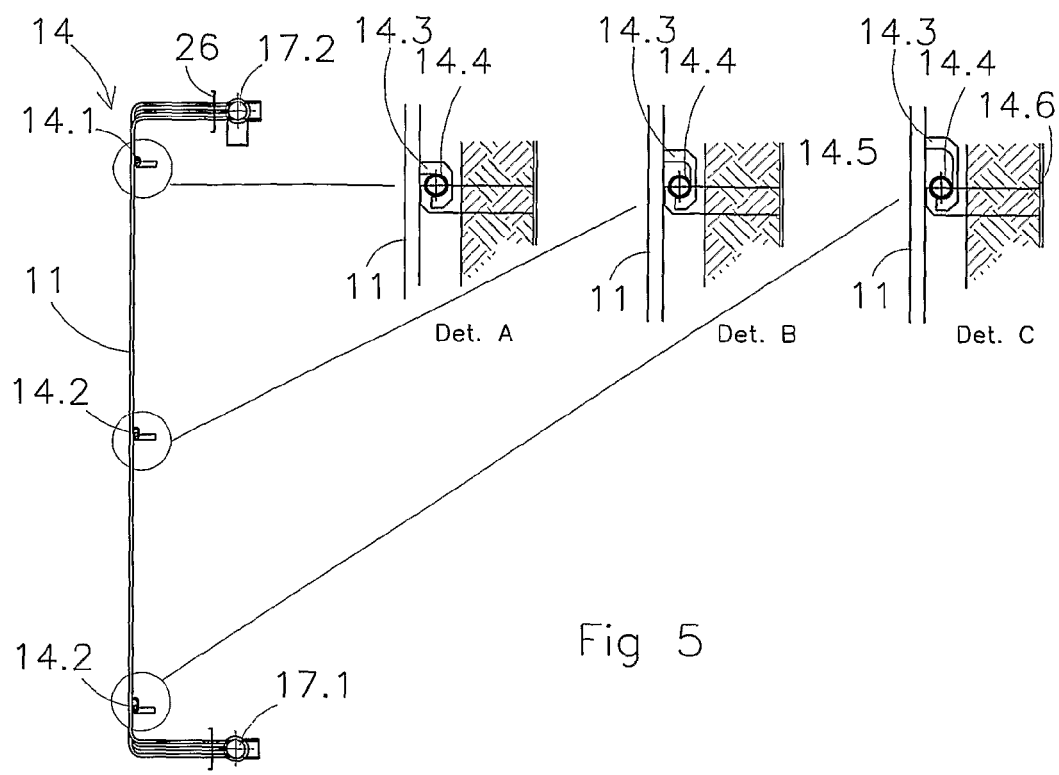
FIG. 5 shows a side view including detailed views A, B, C of a support for a receiver panel of a solar receiver according to the invention.

As shown in FIG. 5 the shield 26 may be provided close to the header 17 to protect the header 17 for incident solar radiation. The shield may be a shielding plate of a ceramic material, but preferably the shield is made of stainless steel. The shielding plate may be spaced apart from the header 17 at the distance of at least 20 centimeters from the header. The shielding plate may be welded or bolted to the heat exchange tubes 11.

Figure 4:
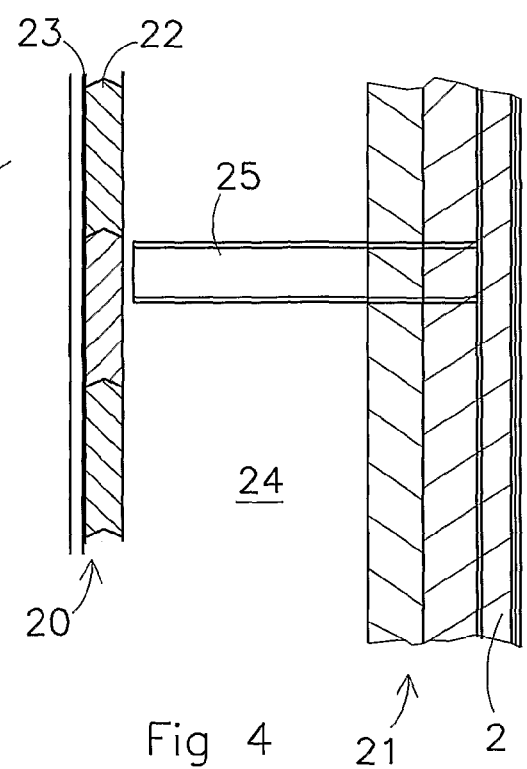
FIG. 4 shows schematic view of a reflector element behind a heat exchange tube in cross section.

FIG. 4 shows in a schematic view a more detailed cross section of the transmission element as a reflector element 20, the cavity 24 and the insulation element 21 as shown in FIG. 3. FIG. 4 shows the reflector element 20 in cross section, wherein the reflector element 20 is arranged with double layers. A sheet 23 forms an outer layer having an outer reflecting surface to reflect incident solar radiation. The sheet 23 is locally fastened to the heat exchanger tubes 11. Inner layer 22 which serves as an inner insulating layer and is locally connected to reflective layer 23. The inner layer 22 has a thickness of at least 50 millimeters, in particular at least 100 millimeters. The inner layer 22 is assembled with fire-resistant blocks, so called pyro-blocs. The blocks have curved side faces which allows a stable construction for the inner layer 22.

FIG. 4 shows further a cavity 24 behind the reflector elements 20 having a dimension of at least 50 centimeters to provide access for a person. The cavity 24 may be provided with accessing means like a platform 25, stairs, floors etc. Opposite to the reflector elements 20, the cavity 24 is enclosed by an insulating element 21. The insulating element 21 may comprise insulating elements like MD2 or Isover. The insulating element is multilayered and has a first layer having a thickness of at least 150 centimeters and a second layer of at least 250 centimeters. The insulating element 21 is mounted to the framework 2 by multiple studs.

FIG. 5 shows a side view of the receiver panel according to the invention accompanied with three views in more detail of a fixation element and a guiding element. The detailed views are indicated with Det A, Det B, Det C. The side view of FIG. 5 shows the receiver panel having heat exchange tubes 11 with at both ends a header 17. The heat exchange tubes 11 are arranged in an array to form a panel of tubes. The heat exchange tubes 11 have a smooth outer surface, an outer diameter of about 38 millimeters and a wall thickness of about 3.5 millimeters. The outer surface of the heat exchange tubes may be black coloured by e.g. a black coating to improve absorption of solar radiation. The main straight portion of the heat exchange tube has a length dimension of about 5 meters. The ends of the heat exchange tubes are bended into a U-shape configuration towards the headers, wherein the length of the bended portions is at least 100 centimeters. The header 17 has a main conduit with an outer diameter of about 250 millimeters.

FIG. 5 shows in the side view a support 14 comprising a fixation element 14.1 and two guiding elements 14.2. The support 14 is designed to permit a free thermal expansion of the heat exchange tube 11 in the longitudinal direction, wherein the support minimizes a displacement of a heat exchange tube 11 in an outward direction. The support 14 is further designed to minimize a displacement of a heat exchange tube 11 in a sidewards direction in particular within a plane defined by the panel of heat exchange tubes. All elements of the support 14 are provided at the backside of the heat exchange tubes 11. The elements form a local connection of the heat exchange tube 11 to a framework 2.

The fixation element 14.1 is arranged at an upper region of the straight portion of the heat exchange tube 11. The fixation element 14 carries at least a part of the weight of the heat exchange tubes 11. The fixation element 14.1 includes a brace or arm 14.6 for a connection to the framework 2.

A first guiding element 14.2 is provided at a mid position of the heat exchange tube 11. A second guiding element is provided at the lower region of the main straight portion of the heat exchange tube 11. The detailed views Det A, B, C show the fixation and guiding elements in more detail. The elements of the support comprise a pair of a bracket 14.3 and a rod 14.4. As shown in the detailed view the bracket 14.3 encloses the rod 14.4. In detailed views B and C an amount of clearance above the rod 14.4 is shown. This amount of clearance gives the heat exchange tube 11 a freedom to move in the longitudinal direction. The bracket 14.3 is connected at one end to the heat exchange tube 11. Basically, the bracket 14.3 is L-shaped having a short leg and a long leg. The short leg of the bracket is connected, e.g. by welding to the heat exchange tube 11. The rod 14.4 is fixed to the framework by an arm. The rod 14.4 extends in the side wards direction of the panel. The rod 14.4 is pipe shaped. The long leg passes the rod 14.4 to enclose the rod in a direction perpendicular to the panel of heat exchange tubes. At a free end of the L-shaped bracket, the bracket has an inwards protrusion for a longitudinally enclosure of the rod within the bracket 14.3. The bracket 14.3 may be manufactured by cutting plate material for example by water cutting. The bracket may be a piece of plate having a slotted hole. Alternatively the bracket 14.3 may be manufactured by bending a piece of pipe material. The inwards extending protrusion may be obtained by e.g. a bending operation.

The fixation and guiding elements preferably comprise a stopper 14.5. The stopper is connected to the rod 14.4 for stopping a movement in side wards direction of the bracket. Herewith, the sidewards movement of a heat exchange tube 11 can be limited. The stopper 14.5 may be a bolt, flange, ring, strip etc. which is fixed to the rod 14.4. It is possible to provide for each heat exchange tube an individual stopper 14.5, but preferably a stopper is provided for a group of heat exchange tubes 11. A group of e.g. six heat exchange tubes may be enclosed by two stoppers 14.5, which limit the movement of the group of heat exchange tubes 11 in side wards directions. The arm 14.6 which is connected to the rod may serve as a stopper 14.5.

Figure 6:
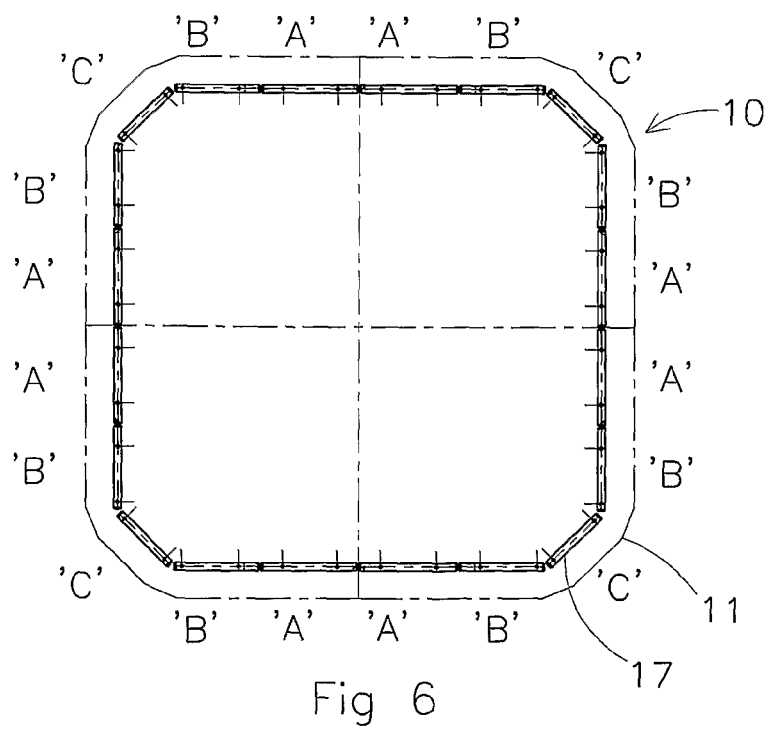
FIG. 6 shows a schematic top view of a solar receiver provided with receiver panels along a circumference of a horizontal cross section.

The solar receiver 10 and receiver panels 12 according to the invention are further illustrated by FIGS. 6 and 7. A solar receiver may comprise a frame work and may have a cross section which includes at least one substantially flat side wall. At least one receiver panel 12 according to the invention may be mounted to the side wall. The cross section of the solar receiver may be polygonal. FIG. 6 shows a cross section which is square, wherein corners of the solar receiver are chamfered. The chamfered corners may define corner walls of a solar receiver which are angled positioned with respect to the side walls.

In an embodiment of the solar receiver according to the invention, the solar receiver comprises a group of receiver panels which cover adjacent angled side walls or corner walls. The group of receiver panels may define a super heater, evaporator, preheater or reheater of a solar power installation. Preferably, the group of receiver panels covers a complete circumference of the cross section. To obtain a complete covering of the circumference without open spaces at corners, a receiver panel may comprise a main panel and a side panel. The main and side panel comprise side by side arranged heat exchange tubes. A complete covering of the circumference of the solar tower by side by side arranged heat exchange tubes can be achieved by arranging the main and side panels side by side.

As shown in FIG. 6 and FIG. 7 different types of receiver panels may be defined. A substantially flat (side wall) panel A, a one sided curved (side wall) panel B and a two sided curved (corner) panel C can be distinguished.

FIG. 6 shows an arrangement of a solar receiver 10 out of several types of receiver panels A, B, and C. The solar receiver of FIG. 6 has a polygon shaped circumference wherein A and B receiver panels are mounted at the side walls and wherein a C receiver panel is mounted the corner walls. Headers 17 are arranged along the circumference. Normally, a solar receiver comprises a receiver panel which is connected to two headers, wherein one header is provided at a top and one at a foot of the receiver panel. The headers of the A and B receiver panels are aligned, wherein the header of the C receiver panel is positioned under an angle of 45°. The stripe-dot line in FIG. 6 indicates the arrangement of the straight main portions of the heat exchange tubes 11. The horizontal arrangement of the heat exchange tubes has more angles than the arrangement of the headers. This is achieved by angular positioned side panels. The B receiver panel has a main panel which is in top view positioned under an angle of 45° with respect to the main panel of the C receiver panel. Two side panels are positioned in between said main panels which provide a closed circumference of the solar receiver panel. The side panels of the B and C receiver panels are angular positioned with respect to the main panels which provide a smoother, more rounded, transition from the receiver panel at the side wall to the receiver panel at the corner wall. Herewith, advantageously, the optical efficiency of the solar receiver may be increased. The solar receiver 10 including A, B and/or C receiver panels may have an increased capability to receive incident solar radiation.

Figures 7A, 7B, 7C:
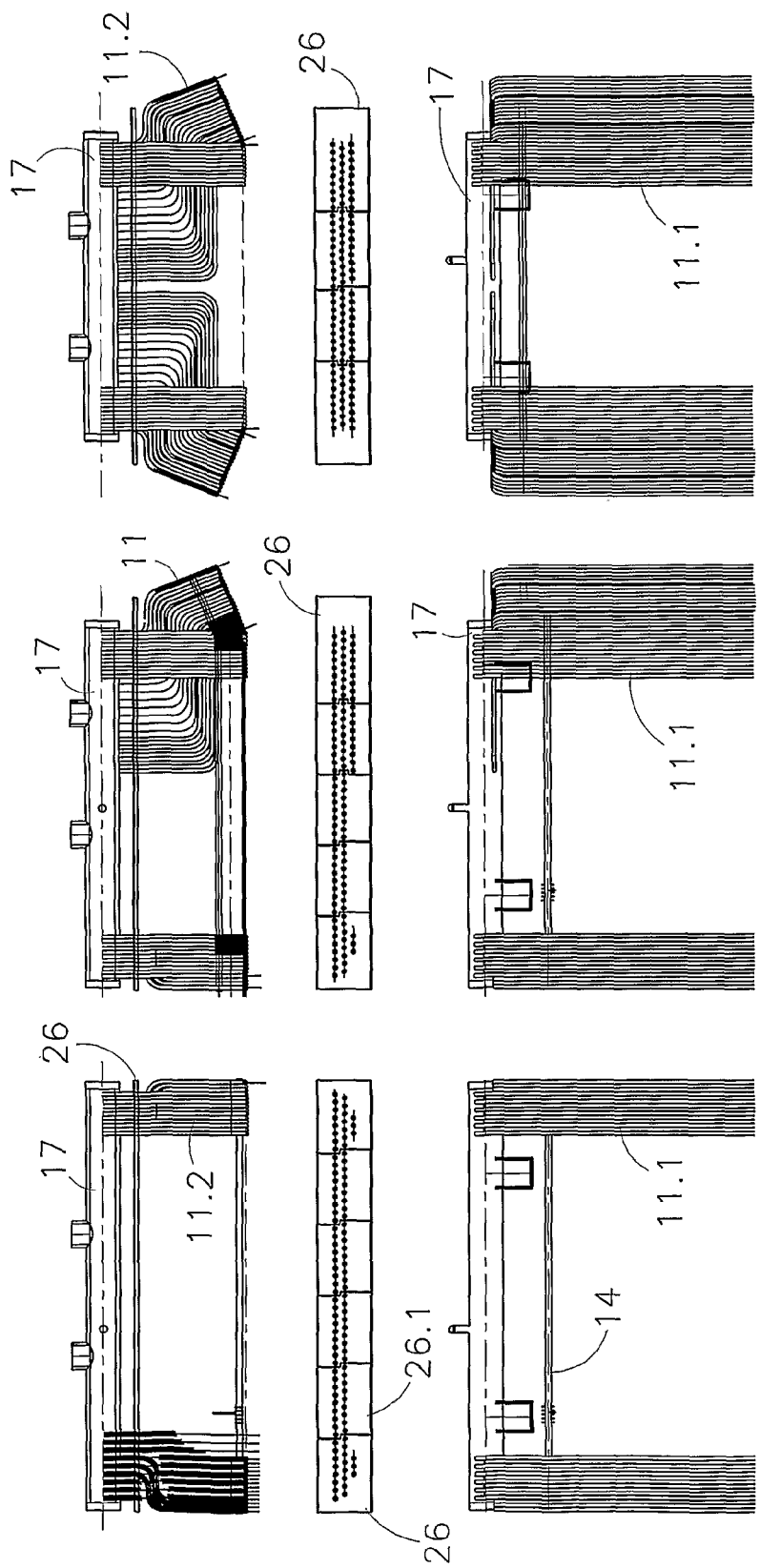
FIG. 7A, B, C show analogous top and front views of respectively an A, B and C type receiver panel.

FIG. 7A-C shows respectively a type A receiver panel, a type B receiver panel and a type C receiver panel.

FIG. 7A-C shows in three corresponding views a header 17 which is connected to heat exchange tubes 11. The header 17 comprises a main conduit having a diameter of about 25 cm and a length of about 2 à 3 meters. The main conduit is closed at both ends and provided with radial extending in- or outlets. A shield 26 is separately shown in a front view in the middle positioned view of FIG. 7A-C. The shield 26 is plate shaped and has a height of about 45 cm and a length which corresponds with a header at the backside of the shield 26. The shield 26 is subdivided in several shield sections 26.1. The header 17 comprises connector organs 17.3 which are arranged in three arrays of connector organs 17.4, 17.5, 17.6. The shield 26 has a corresponding pattern of holes to the connector organs. The heat exchange tubes 11 have inwards extending portions which passes through the shield 26.

FIG. 7A shows a type A receiver panel. The A receiver panel comprises a main panel of heat exchange tubes 11 which have a substantially 2 Dimensional shape. The heat exchange tubes 11 of the main panel are U-shaped having a substantially straight main portion which has at both ends an inwards extending portion. The main portions are substantially straight which means that a small deviation of a mathematically straight arrangement is possible as a result of machining accuracies. The inwards extending portions are connected to the header. The inwards extending portions of the main panel are connected by a single bend to the straight main portions. The A receiver panel further comprises a side panel. The side panel comprises a heat exchange tubes including an inwards extending portion which in contrast to the inwards extending portions of the main panel extends at least partially in a sidewards direction of the receiver panel. This results in a 3 Dimensional shape of the heat exchange tube 11. The heat exchange tube 11 of the side panel may have an inwards extending portion having three bends in substantially perpendicular directions. As shown in the view of the shield 26 comprises three arrays of connector organs. A first and a second array may have staggered arranged connector organs to reduce gaps in between the side by side arranged heat exchange tubes. A third array of connector organs may be provided to connect the inwards extending portions of the side panel on the header 17. In this case, the header 17 is at both ends provided with three connector organs to connect at both ends three heat exchange tubes of a side panel. The side panels of the A receiver panel is arranged in a common plane with the main panel.

FIG. 7B shows a type B receiver panel. The B receiver panel comprises a main panel of heat exchange tubes 11 which have a substantially 2 Dimensional shape. The heat exchange tubes 11 of the main panel are U-shaped having a substantially straight main portion which has at both ends an inwards extending portion. The inwards extending portions are connected to the header. The inwards extending portions of the main panel are connected by a single bend to the straight main portions. The B receiver panel further comprises a side panel. The side panel comprises a heat exchange tubes including an inwards extending portion which in contrast to the inwards extending portions of the main panel extends at least partially in a sidewards direction of the receiver panel. This results in a 3 Dimensional shape of the heat exchange tube 11. The heat exchange tube 11 of the side panel may have an inwards extending portion having three bends in substantially perpendicular directions. As shown in the view of the shield 26 a third array of connector organs may be provided to connect the inwards extending portions of the side panel on the header 17. In this case, the header 17 is at both ends provided with respectively three and about twenty connector organs to connect at both ends a first and a second side panel. The first side panels of the B receiver panel is arranged in a common plane with the main panel and corresponds to a side panel of the type A receiver panel. The second side panel of the B receiver panel has heat exchange tubes with straight main portions which define a plane which is angular positioned with respect to the main panel. The upper view of FIG. 7B shows a top view of the B type receiver panel wherein the angular arrangement of the side panel is shown. The B type receiver panel is in particular suitable for mounting on a side wall of a solar receiver close to a corner wall. The angular positioned side panel of the B receiver panel may extend over the side wall to cover a part of a corner wall. This may prevent an open space and therewith increase the conversion from solar to thermal energy.

FIG. 7C shows a type C receiver panel. The C receiver panel comprises a main panel of heat exchange tubes 11 which have a substantially 2 Dimensional shape. The heat exchange tubes 11 of the main panel are U-shaped having a substantially straight main portion which has at both ends an inwards extending portion. The inwards extending portions are connected to the header 17. The inwards extending portions of the main panel are connected by a single bend to the straight main portions. The C receiver panel further comprises at both sides a side panel. The side panel comprises heat exchange tubes including an inwards extending portion which in contrast to the inwards extending portions of the main panel extends at least partially in a sidewards direction of the receiver panel. This results in a 3 Dimensional shape of the heat exchange tube 11 of a side panel. The heat exchange tube 11 of the side panel may have an inwards extending portion having three bends in substantially perpendicular directions. As shown in the view of the shield 26 a third array of connector organs may be provided to connect the inwards extending portions of the side panel on the header 17. In this case, the header 17 is at both ends provided with seventeen connector organs to connect at both ends seventeen heat exchange tubes of a side panel. The side panels of the C receiver panel have heat exchange tubes with straight main portions which define a plane which is angular positioned with respect to the main panel. The upper view of FIG. 7B shows a top view of the C type receiver panel wherein the angular arrangement of the side panels are shown. The C type receiver panel is in particular suitable for mounting on a corner wall of a solar receiver. The angular positioned side panels of the C receiver panel may extend over the corner wall to cover a part of a corner wall. This may prevent an open space and increase the optical efficiency.

The invention claimed is:

1. A solar power installation comprising:
a tower;
a field of mirrors; and
a solar receiver comprising:
at least two receiver panels having a common outer front surface for receiving incident solar radiation from the field of mirrors;
wherein at least one of the receiver panels comprises an array of side by side arranged heat exchange tubes;
wherein said heat exchange tubes have a substantially straight main portion which extend in an upwards longitudinal direction and an inwards extending portion for a connection to an input or output header for respectively distributing or collecting fluid to or from the heat exchange tubes;
wherein the tower supports the solar receiver at a height above the field of mirrors such that the header is at a vertical height V from the field of mirrors;
wherein the header is at a horizontal distance H with respect to a most far positioned mirror of said field of mirrors;
wherein said receiver panels are spaced apart in the upwards direction at a distance of Z cm;
wherein the header is spaced behind the front surface at a distance of A cm; and
wherein the quotient of Z and A, Z/A, at the most equals the quotient of a vertical V and a horizontal H distance, V/H.

2. The solar power installation according to claim 1 wherein at least one of the receiver panels has an outer front surface for receiving incident solar radiation;
wherein the panel comprises an array of side by side arranged respective heat exchange tubes;
wherein said respective heat exchange tubes have a substantially straight main portion which extend in a longitudinal direction and an inwards extending portion for a connection to a respective input or output header for respectively distributing or collecting fluid to or from the heat exchange tubes; and
wherein the respective header is arranged at a distance A of at least 80 cm behind the outer front surface.

3. The solar power installation according to claim 1;
wherein at least one of the receiver panels of the solar receiver is vertically arranged;
wherein the at least one receiver panel comprises U-shaped heat exchange tubes having upwards arranged main straight portions and a first inwards extending portion at an upper end of the main straight portions to connect the heat exchange tube to a first header and a second inwards extending portion at a lower end of the main straight portion to connect the heat exchange tube at a second header; and
wherein the first header is arranged above the second header and wherein the first header is arranged above or at least at the same height level of the upper end of the main straight portion and the second header is arranged below or at least at the same height level of the lower end of the main straight portion, such that the receiver panel is drainable by gravity.

4. The solar power installation according to claim 3, wherein the first inwards extending portion extends downwards or horizontal from the first header and wherein the second inwards extending portion extends downwards or horizontal to the second header.

5. The solar power installation according to claim 1, wherein at least one of the receiver panels comprises a main panel having heat exchange tubes arranged in front of a header, and wherein an inwards extending portion of at least one heat exchange tube comprises a single bend.

6. The solar power installation according to claim 5, wherein the single bend provides an angle of at least 80° and at most 100° between the inwards extending and the main straight portion.

7. The solar power installation according to claim 1, wherein the inwards extending portion extends within a plane orthogonally to the longitudinal direction of the main straight portion of a heat exchange tube.

8. The solar power installation according to claim 1, wherein a shield is connected to the inwards extending portion for shielding the header.

9. The solar power installation according to claim 8, wherein the shield comprises a reflection surface.

10. The solar power installation according to claim 8, wherein the heat exchange tubes are staggered connected to the header, wherein at least two shields are overlapping arranged on neighbouring heat exchange tubes.

11. The solar power installation according to claim 1, wherein the receiver panel is assembled together with a at least one further receiver panel according to claim 1 to form a receiver panel assembly, wherein both receiver panels have an aligned outer front surface, wherein at least one header is arranged at a distance A of at least 80 cm behind the outer front surface.

12. The solar power installation according to claim 11, wherein the two adjacent receiver panels are spaced apart from and above each other resulting in a space between the receiving planes having a height B of at the most 50 cm in the common plane.

13. The solar power installation according to claim 11, wherein a first shield is connected to an inwards extending portion of a first receiver panel and wherein a second shield is connected to an inwards extending portion of a second receiver panel, wherein the first shield overlaps with the second shield.

14. The solar power installation according to claim 11, wherein the shield is connected to a group of inwards extending portions of heat exchange tubes of a receiver panel.

* * * * *